US012644835B2

(12) United States Patent
Taylor et al.

(10) Patent No.: US 12,644,835 B2
(45) Date of Patent: Jun. 2, 2026

(54) CONTINUOUS SCANNING OPTICAL ASSEMBLY AND METHOD OF USE THEREOF

(71) Applicant: Truvian Sciences, Inc., San Diego, CA (US)

(72) Inventors: Roger Taylor, San Diego, CA (US); Michael Shane Bowen, San Diego, CA (US); George Brabon, San Diego, CA (US); Michael Adams, San Diego, CA (US); Jeff Hawkins, San Diego, CA (US)

(73) Assignee: Truvian Sciences, Inc., San Diego, CA (US)

( * ) Notice: Subject to any disclaimer, the term of this patent is extended or adjusted under 35 U.S.C. 154(b) by 507 days.

(21) Appl. No.: 17/925,808

(22) PCT Filed: May 18, 2021

(86) PCT No.: PCT/US2021/033021
§ 371 (c)(1),
(2) Date: Nov. 16, 2022

(87) PCT Pub. No.: WO2021/236683
PCT Pub. Date: Nov. 25, 2021

(65) Prior Publication Data
US 2023/0175964 A1 Jun. 8, 2023

Related U.S. Application Data

(60) Provisional application No. 63/026,589, filed on May 18, 2020.

(51) Int. Cl.
*G01N 21/64* (2006.01)
*G01N 21/03* (2006.01)
*G01N 21/07* (2006.01)

(52) U.S. Cl.
CPC ......... *G01N 21/6456* (2013.01); *G01N 21/07* (2013.01); *G01N 21/6452* (2013.01);
(Continued)

(58) Field of Classification Search
CPC .... G02B 21/0008; G02B 21/16; G02B 21/26; B01L 3/502715; B01L 2400/0409;
(Continued)

(56) References Cited

U.S. PATENT DOCUMENTS 4,042,462 A 8/1977 Johnson et al.
4,226,531 A 10/1980 Tiffany et al.
(Continued)

FOREIGN PATENT DOCUMENTS

CA 2959410 A1 11/2021
CN 1206832 A 2/1999
(Continued)

OTHER PUBLICATIONS

EP: Extended European Search Report in EP Application No. EP21809423.3 dated Apr. 25, 2024 (7 pages).
(Continued)

*Primary Examiner* — Gordon J Stock, Jr.
(74) *Attorney, Agent, or Firm* — Snell & Wilmer, L.L.P.; April Wurster

(57) ABSTRACT

The present disclosure provides an automated sample analyzer having a continuous scanning optical assembly for performing an assay. The optical assembly allows for robust detection of light emitted from a reaction mixture in a dynamically changing environment, such as detection of light from a reaction mixture that is being rotated about an axis at high rotational velocity.

17 Claims, 18 Drawing Sheets

(52) U.S. Cl.
CPC ................ *G01N 2021/0325* (2013.01); *G01N 2201/103* (2013.01)

(58) Field of Classification Search
CPC .... B01L 2300/0803; G01N 2035/0446; G01N 2035/0449; G01N 35/04; G01N 2201/103; G01N 2201/0446; G01N 2021/0325; G01N 2021/6463; G01N 2021/6476; G01N 21/6456; G01N 21/07; G01N 21/6452; G01N 21/75; G01N 21/255; G01N 21/253
See application file for complete search history.

(56) References Cited

U.S. PATENT DOCUMENTS

| | | | |
|---|---|---|---|
| 4,469,793 A | 9/1984 | Guigan | |
| 4,562,570 A | 12/1985 | Denton | |
| 4,652,137 A | 3/1987 | Calzi | |
| 4,656,009 A | 4/1987 | Benajam | |
| 4,788,139 A | 11/1988 | Ryan | |
| 4,911,642 A | 3/1990 | Knowles | |
| 4,990,075 A | 2/1991 | Wogoman | |
| 5,186,844 A | 2/1993 | Burd et al. | |
| D343,457 S | 1/1994 | Stalec | |
| 5,453,359 A | 9/1995 | Gargan | |
| D383,215 S | 9/1997 | Levy | |
| 5,693,233 A | 12/1997 | Schembri | |
| 5,888,592 A | 3/1999 | Biallas | |
| 5,922,617 A * | 7/1999 | Wang ................... B01L 3/0241 | |
| | | | 436/805 |
| 6,006,911 A | 12/1999 | Levy | |
| 6,062,591 A | 5/2000 | Ruckdeschel et al. | |
| 6,143,248 A | 11/2000 | Kellogg et al. | |
| 6,165,795 A | 12/2000 | Mize | |
| 6,235,531 B1 | 5/2001 | Kopf-Sill et al. | |
| 6,302,134 B1 | 10/2001 | Kellogg et al. | |
| 6,399,361 B2 | 6/2002 | Brotherston et al. | |
| 6,548,788 B2 | 4/2003 | Kellogg et al. | |
| 6,563,584 B1 | 5/2003 | Yurrino et al. | |
| 6,582,662 B1 | 6/2003 | Kellogg et al. | |
| 6,632,399 B1 | 10/2003 | Kellogg et al. | |
| 6,637,463 B1 | 10/2003 | Lei et al. | |
| 6,709,869 B2 * | 3/2004 | Mian ...................... G01N 21/07 | |
| | | | 422/50 |
| 6,752,961 B2 | 6/2004 | Kopf-Sill et al. | |
| 6,811,755 B2 | 11/2004 | McLuen et al. | |
| 6,818,435 B2 | 11/2004 | Carvalho et al. | |
| 6,819,408 B1 | 11/2004 | Scrivens et al. | |
| D501,678 S | 2/2005 | Oberhardt | |
| 6,872,572 B2 | 3/2005 | Brady et al. | |
| 6,935,638 B2 | 8/2005 | Ivanov et al. | |
| 7,094,354 B2 | 8/2006 | Pugia et al. | |
| 7,238,538 B2 | 7/2007 | Freitag et al. | |
| D598,121 S | 8/2009 | Lastella | |
| 7,736,890 B2 | 6/2010 | Sia et al. | |
| 7,790,110 B2 | 9/2010 | Cho et al. | |
| 7,794,849 B2 | 9/2010 | Lu et al. | |
| 7,947,186 B2 | 5/2011 | Soares et al. | |
| 7,991,262 B2 | 8/2011 | Shousterman | |
| 7,998,411 B2 | 8/2011 | Kopf-Sill et al. | |
| 8,119,393 B2 | 2/2012 | Qinwei | |
| 8,212,227 B2 | 7/2012 | Watanabe et al. | |
| 8,221,701 B2 | 7/2012 | Cho et al. | |
| D672,050 S | 12/2012 | Lee et al. | |
| 8,372,357 B2 | 2/2013 | Andersson et al. | |
| D683,045 S | 5/2013 | Domack | |
| 8,731,721 B2 | 5/2014 | Heiner et al. | |
| 8,932,538 B2 | 1/2015 | Kim et al. | |
| 8,945,914 B1 | 2/2015 | Schaff et al. | |
| 8,962,346 B2 | 2/2015 | Schaff et al. | |
| 8,969,070 B2 | 3/2015 | Yoo | |
| 9,108,198 B2 | 8/2015 | Kim et al. | |
| 9,164,091 B2 | 10/2015 | Kim | |
| 9,176,112 B2 | 11/2015 | Zhang et al. | |
| 9,186,668 B1 | 11/2015 | Schaff et al. | |
| 9,186,672 B2 | 11/2015 | Amasia et al. | |
| 9,213,040 B2 | 12/2015 | Hwang et al. | |
| 9,244,065 B1 | 1/2016 | Schaff et al. | |
| 9,279,818 B2 | 3/2016 | Yoo | |
| 9,304,129 B2 | 4/2016 | Schaff et al. | |
| 9,410,127 B2 | 8/2016 | Kim et al. | |
| 9,421,541 B2 | 8/2016 | Moon et al. | |
| 9,470,609 B2 | 10/2016 | Wimberger-Friedl et al. | |
| 9,500,579 B1 | 11/2016 | Sommer et al. | |
| 9,616,424 B2 | 4/2017 | Lee et al. | |
| 9,624,474 B2 | 4/2017 | Park | |
| 9,625,916 B2 | 4/2017 | Da Fonseca et al. | |
| 9,671,345 B2 * | 6/2017 | Manian .............. G01N 21/6452 | |
| 9,725,762 B2 | 8/2017 | Ludowise et al. | |
| 9,726,685 B2 | 8/2017 | Lee et al. | |
| 9,737,889 B2 | 8/2017 | Moon et al. | |
| 9,816,987 B2 | 11/2017 | Mehra et al. | |
| 9,829,426 B2 | 11/2017 | Lee et al. | |
| 9,900,458 B2 * | 2/2018 | Kang ..................... H04N 1/024 | |
| 9,956,556 B2 * | 5/2018 | Filipe Pinto Silva ...................... | |
| | | | G01N 33/4875 |
| D838,380 S | 1/2019 | Self et al. | |
| 10,568,317 B2 | 2/2020 | Deshamais et al. | |
| D895,136 S | 9/2020 | Whitehead | |
| D895,141 S | 9/2020 | Heron | |
| D897,555 S | 9/2020 | Chou | |
| D915,618 S | 4/2021 | Heron | |
| D936,856 S | 11/2021 | Hawkins et al. | |
| D954,295 S | 6/2022 | Hawkins et al. | |
| D959,019 S | 7/2022 | Hawkins et al. | |
| D960,386 S | 8/2022 | Hawkins et al. | |
| D968,643 S | 11/2022 | Hawkins et al. | |
| 11,638,918 B2 | 5/2023 | Kleinemolen et al. | |
| 2002/0031833 A1 | 3/2002 | Heyneker et al. | |
| 2002/0076354 A1* | 6/2002 | Cohen .............. B01L 3/502753 | |
| | | | 435/7.9 |
| 2002/0094147 A1 | 7/2002 | Heron et al. | |
| 2002/0160170 A1 | 10/2002 | Ishige | |
| 2003/0044992 A1 | 3/2003 | Chao et al. | |
| 2003/0064004 A1 | 4/2003 | Agren et al. | |
| 2003/0127609 A1 | 7/2003 | El-Hage | |
| 2003/0133840 A1* | 7/2003 | Coombs ........... G01N 33/54353 | |
| | | | 435/39 |
| 2003/0161761 A1 | 8/2003 | Williams | |
| 2003/0179378 A1 | 9/2003 | Lafferty | |
| 2004/0009582 A1 | 1/2004 | Sandall | |
| 2004/0057244 A1 | 3/2004 | Amano | |
| 2004/0120856 A1 | 6/2004 | Andersson et al. | |
| 2004/0139455 A1 | 7/2004 | Ute et al. | |
| 2004/0159343 A1 | 8/2004 | Shimbara et al. | |
| 2004/0182795 A1 | 9/2004 | Dorian | |
| 2004/0203136 A1 | 10/2004 | Kellogg et al. | |
| 2005/0003939 A1 | 1/2005 | Womer et al. | |
| 2005/0048575 A1 | 3/2005 | Coassin et al. | |
| 2005/0136545 A1 | 6/2005 | Schmid et al. | |
| 2005/0152807 A1 | 7/2005 | Osterloh et al. | |
| 2005/0229696 A1 | 10/2005 | Takayama | |
| 2005/0272142 A1 | 12/2005 | Horita | |
| 2006/0060781 A1 | 3/2006 | Watanabe et al. | |
| 2006/0160210 A1 | 7/2006 | Mori et al. | |
| 2006/0223166 A1 | 10/2006 | Wilding et al. | |
| 2006/0257992 A1 | 11/2006 | McDevitt et al. | |
| 2007/0010007 A1 | 1/2007 | Aysta et al. | |
| 2007/0166835 A1 | 7/2007 | Bobrow et al. | |
| 2007/0190525 A1 | 8/2007 | Gu et al. | |
| 2007/0298433 A1 | 12/2007 | Sia et al. | |
| 2008/0094974 A1* | 4/2008 | Worthington .... G01N 35/00069 | |
| | | | 369/53.2 |
| 2008/0138247 A1* | 6/2008 | Inganas ............ G01N 35/00069 | |
| | | | 422/68.1 |
| 2009/0123958 A1 | 5/2009 | Carmon | |
| 2009/0186357 A1 | 7/2009 | Mauk et al. | |
| 2009/0202848 A1 | 8/2009 | Lu | |
| 2009/0298092 A1 | 12/2009 | Tsai et al. | |
| 2009/0298116 A1 | 12/2009 | Fang | |
| 2010/0055766 A1 | 3/2010 | Hwang et al. | |
| 2010/0081213 A1 | 4/2010 | Lee et al. | |
| 2010/0193686 A1 | 8/2010 | Watanabe et al. | |

(56) References Cited

U.S. PATENT DOCUMENTS

| | | |
|---|---|---|
| 2011/0038767 A1 | 2/2011 | Baril |
| 2011/0086778 A1 | 4/2011 | Hermann |
| 2011/0151435 A1 | 6/2011 | Mehra et al. |
| 2011/0152202 A1 | 6/2011 | Du Clos |
| 2011/0180407 A1 | 7/2011 | Tyrrell |
| 2011/0189701 A1 | 8/2011 | Kim |
| 2011/0269151 A1 | 11/2011 | Kim |
| 2011/0312015 A1 | 12/2011 | Velaskar |
| 2012/0041315 A1 | 2/2012 | Mycek et al. |
| 2012/0142089 A1 | 6/2012 | Park |
| 2012/0200856 A1 | 8/2012 | Bae |
| 2012/0202673 A1 | 8/2012 | Runyon et al. |
| 2012/0208013 A1 | 8/2012 | Clapper |
| 2012/0225446 A1 | 9/2012 | Wimberger-Friedl et al. |
| 2013/0002753 A1 | 1/2013 | Wang et al. |
| 2013/0118581 A1 | 5/2013 | Zhou |
| 2013/0203634 A1 | 8/2013 | Jovanovich |
| 2013/0224568 A1 | 8/2013 | Fukunago et al. |
| 2013/0273584 A1 | 10/2013 | Masci |
| 2014/0017806 A1 | 1/2014 | Lee |
| 2014/0138260 A1 | 5/2014 | Briman |
| 2014/0185031 A1 | 7/2014 | Zhang et al. |
| 2014/0287524 A1 | 9/2014 | Lee et al. |
| 2014/0319379 A1 | 10/2014 | Manian |
| 2014/0341788 A1 | 11/2014 | Kim et al. |
| 2015/0011020 A1 | 1/2015 | Sundvor |
| 2015/0064774 A1 | 3/2015 | Moon et al. |
| 2015/0079655 A1 | 3/2015 | Laugham |
| 2015/0090674 A1 | 4/2015 | Lee et al. |
| 2015/0132753 A1 | 5/2015 | Ye et al. |
| 2015/0226652 A1 | 8/2015 | Jayavanth et al. |
| 2015/0293097 A1 | 10/2015 | Godec et al. |
| 2015/0293270 A1* | 10/2015 | Jarvius .................. G02B 27/40 |
| | | 264/220 |
| 2015/0307927 A1 | 10/2015 | Nobile |
| 2015/0321192 A1 | 11/2015 | Lee |
| 2015/0360225 A1 | 12/2015 | Schaff et al. |
| 2015/0362509 A1 | 12/2015 | Woodworth |
| 2016/0038939 A1 | 2/2016 | Min et al. |
| 2016/0038940 A1 | 2/2016 | Babcock |
| 2016/0040213 A1 | 2/2016 | Ludowise et al. |
| 2016/0069919 A1 | 3/2016 | Holmes |
| 2016/0279640 A1 | 9/2016 | Iqbal |
| 2016/0369323 A1 | 12/2016 | Revilla |
| 2017/0023446 A1 | 1/2017 | Rietveld et al. |
| 2017/0067871 A1 | 3/2017 | DeLouise et al. |
| 2017/0080416 A1 | 3/2017 | Panetz |
| 2017/0108494 A1 | 4/2017 | Mehra et al. |
| 2017/0120259 A1 | 5/2017 | Takeuchi |
| 2017/0151559 A1 | 6/2017 | Da Fonseca et al. |
| 2017/0176306 A1 | 6/2017 | Boehm et al. |
| 2017/0176481 A1 | 6/2017 | Accurso |
| 2017/0304826 A1 | 10/2017 | Lee et al. |
| 2017/0354970 A1 | 12/2017 | Reis et al. |
| 2018/0038853 A1 | 2/2018 | Mehra et al. |
| 2018/0154353 A1 | 6/2018 | Glezer et al. |
| 2018/0161772 A1 | 6/2018 | Rammohan |
| 2018/0352806 A1 | 12/2018 | Desharnais et al. |
| 2019/0086324 A1 | 3/2019 | Marrinucci et al. |
| 2019/0162670 A1 | 5/2019 | Nose et al. |
| 2019/0300948 A1 | 10/2019 | Cuppens |
| 2019/0314813 A1 | 10/2019 | Doolan |
| 2019/0388596 A1 | 12/2019 | Camisani |
| 2020/0064254 A1 | 2/2020 | Vanderklein et al. |
| 2020/0065959 A1* | 2/2020 | Shartle .............. B01L 3/502715 |
| 2021/0011001 A1 | 1/2021 | Chou et al. |
| 2023/0279326 A1* | 9/2023 | Taylor .................. G01N 35/025 |
| | | 356/244 |

FOREIGN PATENT DOCUMENTS

| | | | |
|---|---|---|---|
| CN | 201298019 Y | 8/2009 |
| CN | 1664543 B | 12/2014 |
| CN | 110531065 A | 12/2019 |
| CN | 211926319 U | 11/2020 |
| DE | 19858443 A1 | 7/2000 |
| EP | 163063 A2 | 12/1985 |
| EP | 1542010 | 6/2005 |
| EP | 2116305 A1 | 11/2009 |
| GB | 2387642 A | 10/2003 |
| JP | 2000011507 A | 1/2000 |
| JP | 2003100001 A | 4/2003 |
| JP | 2013223441 A | 10/2013 |
| JP | 6016168 B2 | 10/2016 |
| WO | 1995033986 A1 | 12/1995 |
| WO | 1999037819 A2 | 7/1999 |
| WO | 2005083423 A2 | 9/2005 |
| WO | 2005119211 A1 | 12/2005 |
| WO | 2009093838 A9 | 7/2009 |
| WO | 2011084697 A2 | 7/2011 |
| WO | 2011093602 A2 | 8/2011 |
| WO | 2011160015 A2 | 12/2011 |
| WO | 2013188574 A2 | 12/2013 |
| WO | 2014010927 A1 | 1/2014 |
| WO | 2014172235 A1 | 10/2014 |
| WO | 2016204638 A2 | 12/2016 |
| WO | 2016204638 A3 | 2/2017 |
| WO | 2017027384 A1 | 2/2017 |
| WO | 2017103029 A1 | 6/2017 |
| WO | 2017165630 A1 | 9/2017 |
| WO | 2017190192 A1 | 11/2017 |
| WO | 2017212031 A1 | 12/2017 |
| WO | 2018005464 A1 | 1/2018 |
| WO | 2018117268 A1 | 6/2018 |
| WO | 2018145005 A1 | 8/2018 |
| WO | 2019202167 A1 | 10/2019 |
| WO | 2020176607 A1 | 9/2020 |
| WO | 2020227643 A1 | 11/2020 |
| WO | 2021236675 A1 | 11/2021 |
| WO | 2021236683 A1 | 11/2021 |

OTHER PUBLICATIONS

Hawkins, "Rethinking the Clinical Laboratory Test Value Chain: Using New Technologies and New Approaches to Lower Costs, Speed Time-to-Answer, and Contribute to Improved Patient Outcomes," Truvian Slide Deck pp. 1-19 (Apr. 27, 2021).

Theranos' Elizabeth Holmes Speaks at AACC Meeting. "Theranos Science & Technology: The Miniaturization of Laboratory Testing," American Association for Clinical Chemistry [Video] [Screen captures from video retrieved on the Internet at URL: https://www.mpo-mag.com/contents/view_videos/2016-08-02/theranos-elizabeth-holmes-speaks-at-aacc-meeting/] pp. 1-6 (Aug. 2, 2016).

WO: International Preliminary Report on Patentability for PCT/US2021/033021 dated Nov. 17, 2022 (19 pages).

WO: International Search Report and Written Opinion for PCT/US2021/033021 dated Aug. 31, 2021 (13 pages).

"Red Blood Cell," Wikipedia (Retrieved from the Internet on Jun. 11, 2020 at https://en.wikipedia.org/wiki/Red blood cell) (1987), p. 4.

Bond et al., "Drop-to-Drop Variations in the Cellular Components of Fingerprick Blood," Am. J. Clin. Pathol. 144, pp. 885-894 (2015).

EP: Examination Report issued in European Application No. EP19752798.9 dated Oct. 8, 2025 (9 pages).

Gale et al., "A review of current Methods in Microfluidic device fabrications and Future commercialization prospects," 3(60): pp. 1-25 (2018).

Giroux et al., "Influence of calcium ions in the flow cytometric analysis of human CD8-positive cells," 62A(1):61-64 (Nov. 2004) https://doi.org/10.1002/cyto.a.20084.

Hauke et al., "An Improved Design and Versatile New Lamination Fabrication Method for Twin Electrode Thin Layer Cells Utilizing Track-etch Membranes", Electroanalysis, Viic Publishiers, Inc, US, 31(1) (2018): pp. 58-65 XP071939736, ISSN: 1040-0397, DOI: 10.1002/ELAN.201800539.

Kartell Microscope Slide Tray. Online, published date unknown. Retrieved on Jan. 28, 2025 from URL: https://www.dynalon.com/PublicStore/producUKartelI-Microscope-Slide-Tray,274,314.aspx.

(56)  References Cited

OTHER PUBLICATIONS

Kratz et al., "Characterization of four functional biocompatible pressure-sensitive adhesives for rapid prototyping of cell-based lab-on-a-chip and organ-on-a-chip systems," Scientific Reports 9(1), 9287 (2019) https://doi.org/10.1038/s41598-019-45633-x.

Lassale et al., "Elements of the complete blood count associated with cardiovascular disease incidence: Findings from the EPIC-NL cohort study," Scientific Reports (2018) 8:3290.

Li et al., "Out-of-plane microvalves for whole blood separation on lab-on-a-CD;Out-of-plane microvalves for whole blood separation on lab-on-a-CD", Journal of Micromechanics & Microengineering, Institute of Physics Publishing, Bristol, GB, vol. {0} 20, No. {0} 10, Sep. 29, 2010 (Sep. 29, 2010), p. 105024, XP020198610 DOI: 10.1088/0960-1317/20/10/105024.

Olanrewaju et al., "Capillary microfluidics in microchannels: from microfluidic networks to capillaric circuits", Lab on a Chip, 18, pp. 2315-2478 (2018) Available on the Internet at URL: https://pubs.rsc.org/en/content/articlelanding/2018/lc/c8lc00458g.

Steigert et al., "Integrated siphon-based metering and sedimentation of whole blood on a hydrophilic lab-on-a-disk", Biomedical Microdevices, Kluwer Academic Publishers, Bo, vol. {0} 9, No. {0} 5, May 16, 2007 (May 16, 2007), p. 675-679, XP019524286 DOI: 10.1007/S10544-007-9076-0 external link.

Unico "PowerSpin™ DX Centrifuge" (2015).

Wörner et al., "Platelet aggregation and the release induced by inophores for divalent cations," Thrombosis Research 6(4):295-305 (1975).

Zhang et al., "A simple statistical parameter for use in evaluation and validation of high throughput screening assays" Journal of Biomolecular Screening 4:67-73 (1999).

* cited by examiner

1

CONTINUOUS SCANNING OPTICAL ASSEMBLY AND METHOD OF USE THEREOF

CROSS-REFERENCE TO RELATED APPLICATION(S)

This application is a 35 USC § 371 National Stage application of International Application No. PCT/US2021/033021 filed May 18, 2021, now pending; which claims the benefit under 35 USC § 119 (e) to U.S. Application Ser. No. 63/026,589 filed May 18, 2020. The foregoing applications are hereby incorporated by reference in their entirety.

BACKGROUND OF THE INVENTION

Field of the Invention

The present invention relates generally to diagnostics and more specifically to an automated sample analyzer having a continuous scanning optical assembly, as well as related methods of use of the analyzer to perform an assay.

Background Information

Direct-to-consumer (DTC) diagnostics involves consumers (e.g., patients) directly accessing healthcare or wellness-related diagnostic tests and test results, without the need for a doctor's prescription. Recently, U.S. and international DTC diagnostics markets have expanded rapidly as a result of growing consumer interest in the tracking of personalized fitness, wellness, and healthcare-related information.

A key to the success of DTC diagnostics is the availability of robust technologies for testing a broad range of diagnostically meaningful analytes with accuracy, fast turnaround times, and at low-cost. While certain handheld or portable devices, such as blood glucose meters, or test strips, e.g., for urine analysis, have been developed to facilitate personalized medical testing ("bedside testing" or point-of-care testing (POCT)") by healthcare providers, there remains a need for technologies facilitating the reliable, rapid, and cost-effective analysis of multiple analytes, e.g., at a "point-of-customer-contact (POCC)" site, such as in a pharmacy or a general store.

Various conventional sample analyzers that utilize optical detection modules to conduct diagnostic testing are known in the art. Many of these analyzers are generally based on confocal imaging to detect light emitted from a sample and reagent mixture to detect the presence of an analyte. A classic confocal imager includes a light source and a detector in conjugate imaging planes. Before the advent of lasers and infinity optics, this was possible using conjugate pinholes placed in front of the light source and the detector (FIG. 1).

The theory of operation is that the pinhole limits the Z depth of the imaging voxel thereby removing out of focus light from entering the detector. A detriment of this is that the pinhole destroys spatial information about the image and retains only intensity. For this reason, confocal imagers are usually point scanners that raster the beam across a sample to produce an image.

Now, with the advent of lasers and infinity corrected optics, confocal designs have evolved. Rather than relying on conjugate pinholes, modern confocal systems typically rely on laser beam collimation and an objective back aperture with a focus to infinity (collimated). Since both the image and the laser are collimated at the back aperture of the objective lens (defocused), then they are inherently confocal. The tube lens that collects the fluorescent signal from the sample refocuses the light back to an image of the sample at the pinhole which blocks out of focus light as shown in FIG. 2.

Since the sample and the pinhole share the same image plane, it is possible to calculate the spot sizes of the laser, the pinhole, and the image collection together using the following equations.

$$\text{Back Aperture diameter} = 2 * NA * \text{effective Focal Length} \qquad \text{Equation 1}$$

$$\text{Spot Diameter} = 1.22 * \frac{\lambda}{NA} \qquad \text{Equation 2}$$

$$\text{pinhole diameter} = \qquad \text{Equation 3}$$

$$\text{Magnification of system} * \text{Collection optics Spot Size}$$

where NA is the numerical aperture of the objective, effective Focal Length is the working distance of the objective, $\lambda$ is the wavelength of excitation light, and magnification of the system is the total magnification of the objective-tube lens combination.

Use of these equations have led to development of a variety of sample analyzers having different optical imaging system designs. However, there exists a continual need for new optical systems that have increased robustness in detection and which are capable of robust detection in a dynamic and varying environment.

SUMMARY OF THE INVENTION

The present disclosure provides an automated sample analyzer having a continuous scanning optical assembly for performing an assay. The optical assembly allows for robust detection of light emitted from a reaction mixture in a dynamically changing environment, such as detection of light from a reaction mixture that is being rotated about an axis at high rotational velocity.

Accordingly, in one embodiment, the disclosure provides an automated sample analyzer including a rotation assembly and an optical assembly in operable connection with a processor for controlling operation of the analyzer. In certain aspects, the rotation assembly is operable to start and stop continuous rotation of a planar substrate, the substrate having a well disposed within a perimeter of the substrate, wherein the well is configured to hold a reaction mixture including a sample and reagent. In some aspects, the optical assembly has an illumination source and an illumination detector and is operable to irradiate the reaction mixture with light emitted from the illumination source and detect emission light from the reaction mixture via the illumination detector. In some aspects, the optical assembly is configured to generate a coincidence of the focal points of the illumination and detection light paths on a plane of rotation of the substrate. In certain aspects, the processor is operable to control movement of the rotation assembly (e.g., start, stop, velocity and the like), wherein the processor includes functionality to cause the rotation assembly to continually rotate the substrate and adjust a height of the plane of rotation of the substrate relative to the focal point.

In another embodiment, the disclosure provides a method of analyzing a sample using the automated sample analyzer of the disclosure. The method includes: a) coupling a substrate to the rotation assembly, the substrate having a well disposed within a perimeter of the substrate, wherein the well includes a reaction mixture having a sample and reagent; b) rotating the substrate within a plane of rotation; c) determining optimal focus and moving the rotation assembly to be in an appropriate position such that the reaction mixture is coincident with the focal plane of excitation and simultaneously with the focal plane of the optical assembly; and d) detecting emission light of the reaction mixture via the optical assembly and processor, thereby analyzing the sample.

In still another embodiment, the disclosure provides a method of detecting a disease or disorder in a subject. The method includes: a) obtaining a sample from a subject; b) analyzing the sample using the automated sample analyzer and method of the disclosure; and c) detecting a disease or disorder in the subject based on the analysis of (b), thereby detecting a disease or disorder in the subject.

In yet another embodiment, the disclosure provides a method of analyzing a sample. The method incudes: a) rotating a substrate having a well disposed within a perimeter of the substrate, wherein the substrate is configured to hold a reaction mixture including a sample and reagent; b) illuminating the reaction mixture while the substrate is being rotated using an optical assembly having an illumination source and an illumination detector, wherein the optical assembly is operable to irradiate the reaction mixture with light emitted from the illumination source and detect emission light from the reaction mixture via the illumination detector, and wherein the optical assembly is configured to generate a coincidence of the focal points of the illumination and detection light paths on a plane of rotation of the substrate; c) collecting and processing sequential measurements of detected emission light at dynamic intervals during rotation of the substrate; d) adjusting the position of the substrate upon instructions from a processor by changing a height of the plane of rotation of the substrate relative to the focal point while the position of the focal point remains constant; e) collecting and processing sequential measurements of detected emission light at dynamic intervals during rotation of the substrate; and f) determining the amount of an analyte of the reaction mixture based on the sequential measurements of (c) or (e).

In another embodiment, the disclosure provides a non-transitory computer readable storage medium encoded with a computer program. The computer program includes instructions that when executed by one or more processors cause the one or more processors to perform operations to perform a method of the invention.

In still another embodiment, the disclosure provides a computing system. The system includes a memory, and one or more processors coupled to the memory, with the one or more processors being configured to perform operations that implement a method of the invention.

DETAILED DESCRIPTION OF THE INVENTION

The present disclosure is based on an innovative sample analyzer that includes an optical assembly that allows for continuous scanning and detection of light emitted from a reaction mixture that is being rotated about an axis at high velocity. The optical assembly is capable of conducting multianalyte detection in a plurality of sample wells disposed within a planar substrate that are being rotated simultaneously.

Before the present compositions and methods are described, it is to be understood that this invention is not limited to particular methods and experimental conditions described, as such compositions, methods, and conditions may vary. It is also to be understood that the terminology used herein is for purposes of describing particular embodiments only, and is not intended to be limiting, since the scope of the present invention will be limited only in the appended claims.

As used in this specification and the appended claims, the singular forms "a", "an", and "the" include plural references unless the context clearly dictates otherwise. Thus, for example, references to "the method" includes one or more methods, and/or steps of the type described herein which will become apparent to those persons skilled in the art upon reading this disclosure and so forth.

Unless defined otherwise, all technical and scientific terms used herein have the same meaning as commonly understood by one of ordinary skill in the art to which this invention belongs. Although any methods and materials similar or equivalent to those described herein can be used in the practice or testing of the invention, the preferred methods and materials are now described.

Figure 3A:
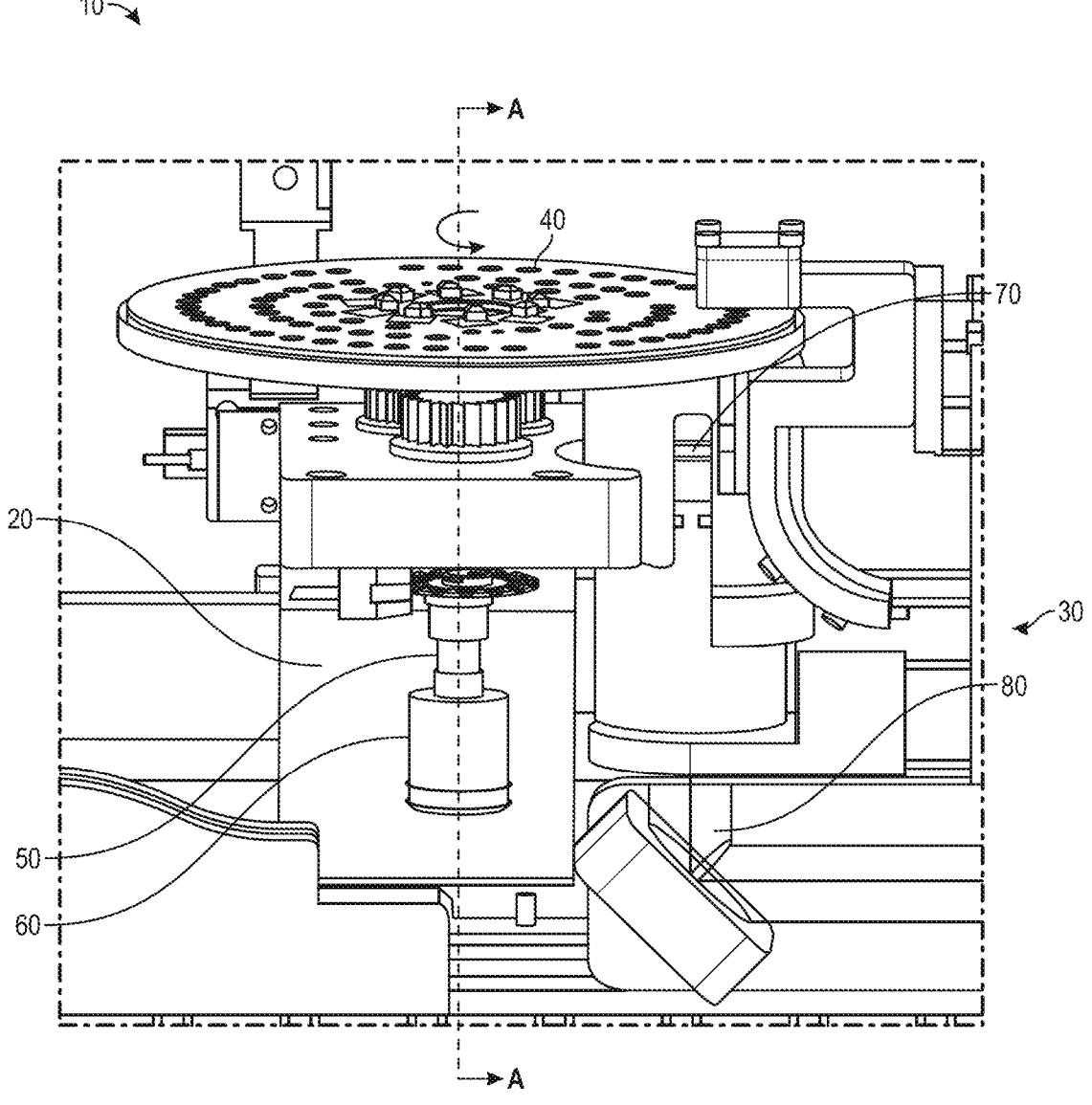
FIGS. 3A-3B are a perspective view of a portion of a sample analyzer of the disclosure showing the rotation assembly and portions of the optical assembly in one aspect of the invention.

Accordingly, in one embodiment, the disclosure provides an automated sample analyzer including a rotation assembly and an optical assembly in operable connection with a processor for controlling operation of the analyzer. FIG. 3A shows a portion of a sample analyzer 10 having a rotation assembly 20 and optical assembly 30 with a planar substrate 40 mounted on a drive shaft 50 of a rotational motor 60, the planar substrate 40 being positioned above an objective lens 70 of the optical assembly 30.

Figure 3B:
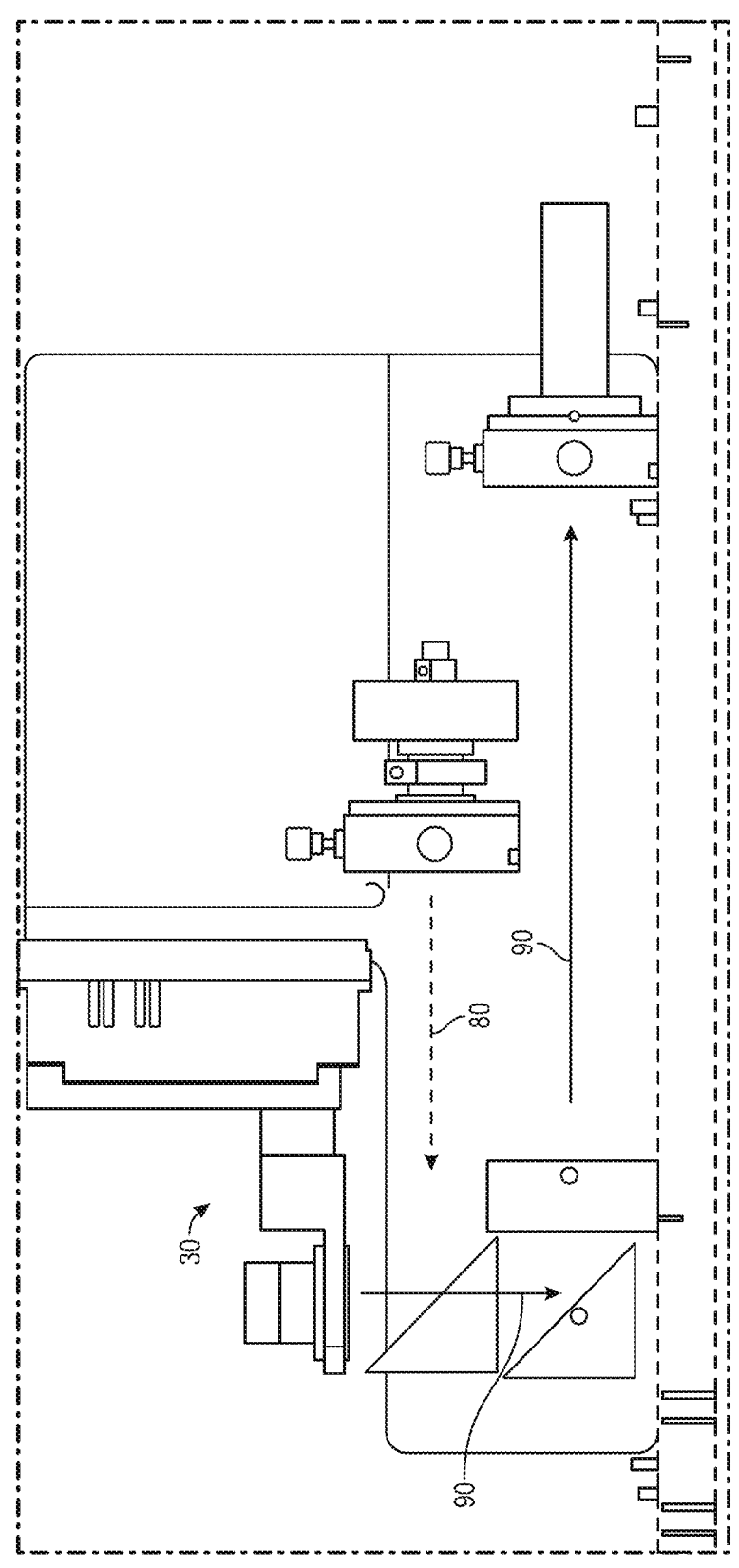

In certain aspects of the disclosure, the general architecture of the optical assembly 30 is shown in FIG. 3B with an excitation light path 80 emitted from an illumination source and an emission light path 90 directed to an illumination detector.

In certain aspects, the rotation assembly 20 is operable to start and stop continuous rotation of a planar substrate 40, the substrate 40 having one or more sample wells disposed within a perimeter of the planar substrate, wherein the wells are configured to hold a reaction mixture including a sample and reagent. As shown in FIG. 3A the rotation assembly 20 includes the rotational motor 60 operably connected to the drive shaft 50 that rotates the planar substrate 40 about the longitudinal axis (line A-A) of the drive shaft 50 in a plane of rotation that passes the sample well through the excitation light path 80 emitted from the illumination source above the objective lens 70.

Figure 4:
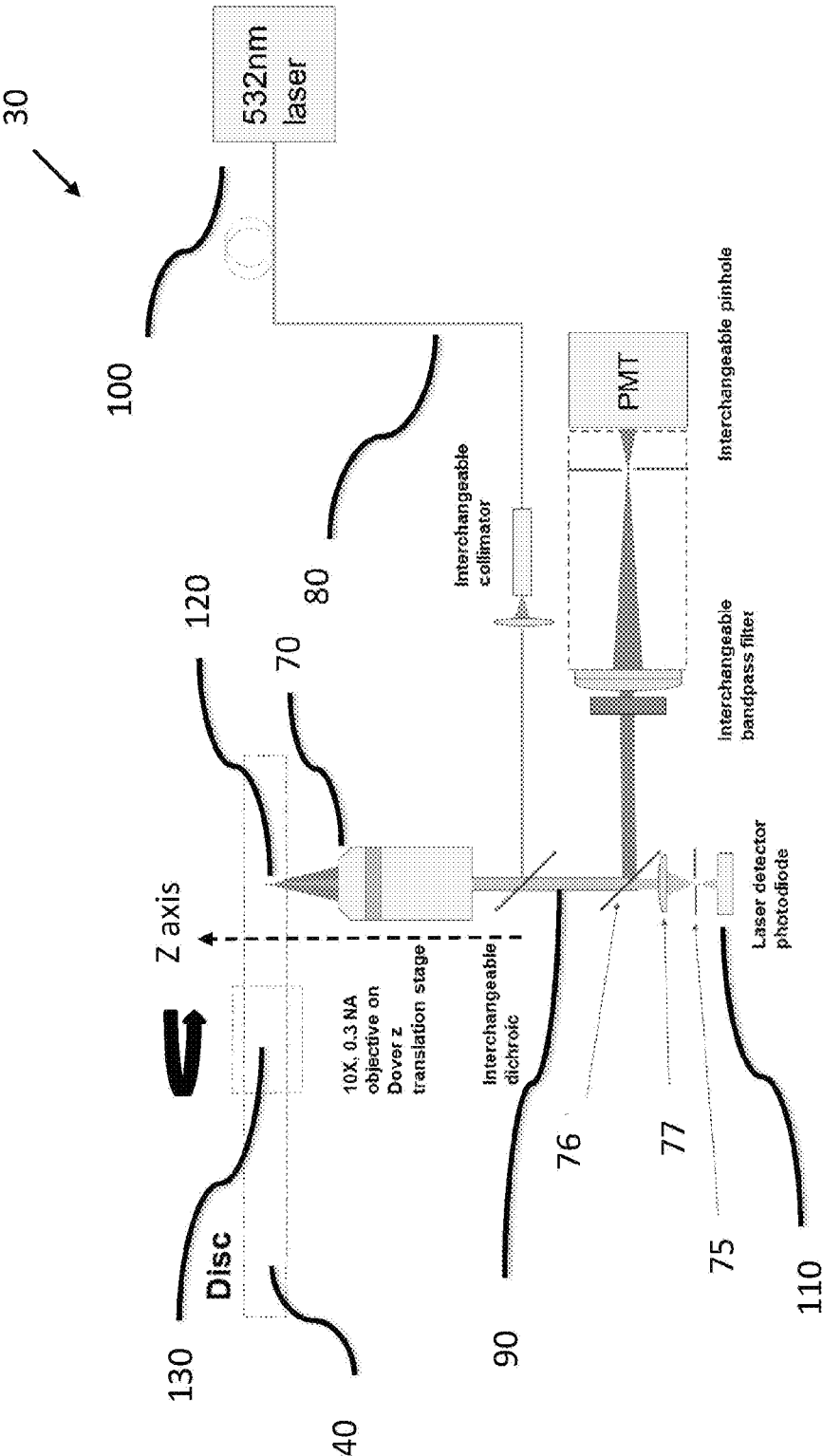
FIG. 4 is a schematic showing the architecture of an optical assembly of the disclosure in one aspect of the invention.
Figure 5:
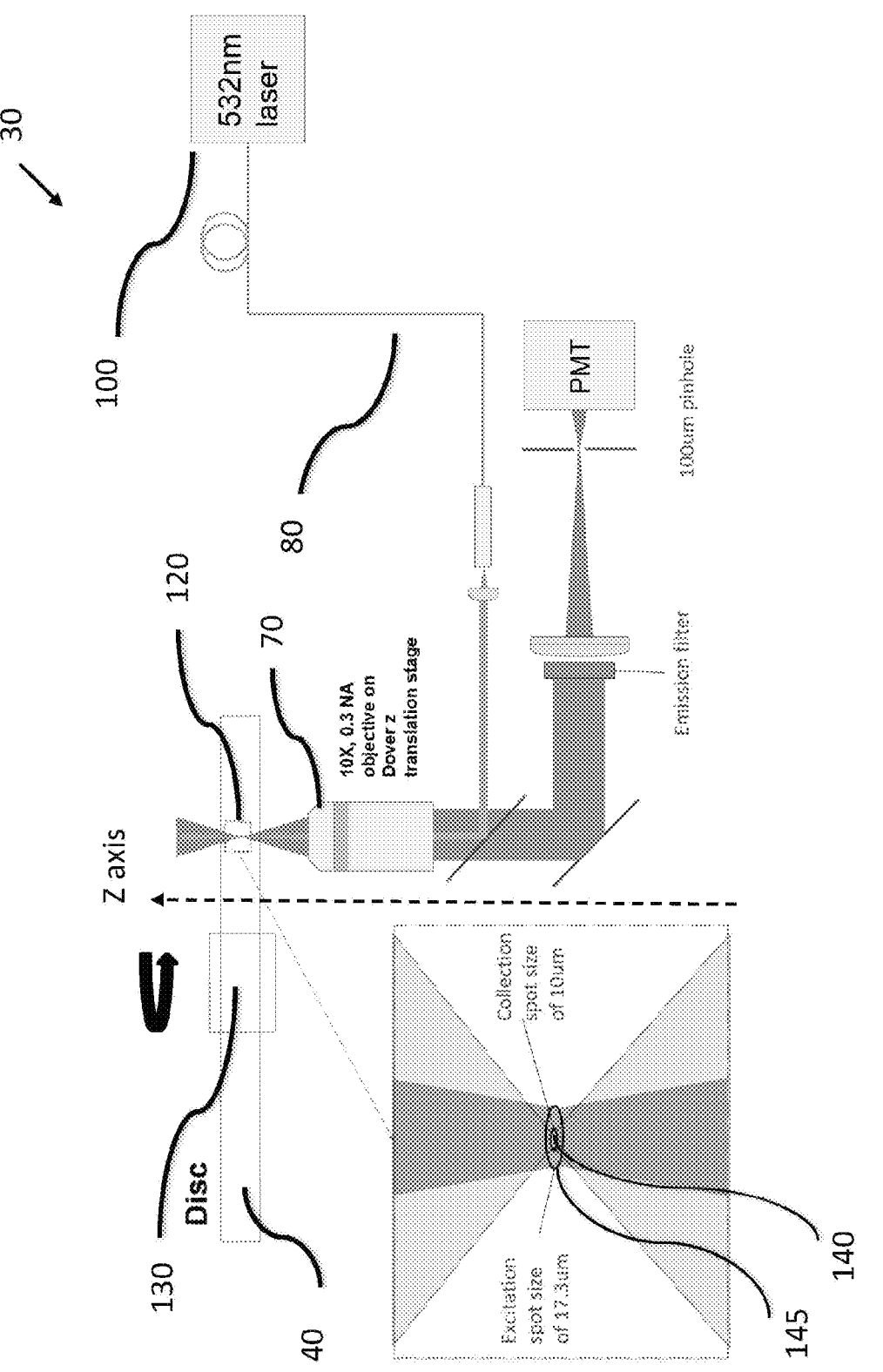
FIG. 5 is a schematic showing the architecture of an optical assembly of the disclosure in one aspect of the invention.

FIGS. 4 and 5 are schematics showing the general architecture of the optical assembly 30 in certain aspects of the invention. With reference to FIGS. 4 and 5, the optical assembly 30 includes an illumination source 100 that emits excitation light 80 which is directed and focused at a focal point 120 within the plane of rotation 130 thereby irradiating a reaction mixture within a well of the planar substrate 40. Emission light 90 from the reaction mixture is then directed to an illumination detector 110 of the optical assembly 30. As such, in certain aspects, the optical assembly 30 has an illumination source 100 and an illumination detector 110 and is operable to irradiate the reaction mixture with excitation light 80 emitted from the illumination source 100 and detect emission light 90 from the reaction mixture via the illumination detector 110. The optical assembly 30 is configured to generate a coincidence of the focal points 120 of the illumination and detection light paths on the plane of rotation 130 of the planar substrate 40. As shown in FIGS. 4 and 5, the plane of rotation 130 is generally perpendicular to the optical axis of light emitted from the illumination source 100 that traverses the plane of rotation 130.

With reference to FIG. 4, in some aspects during operation, when the focal point 120 is positioned at one of the polycarbonate film interfaces of the planar substrate 40, reflected light is collimated by the objective lens 70 and focused through a confocal pinhole 75 matched to the magnified laser waist. A longpass dichroic reflector 76 is also provided in the light path and configured to transmit laser light and reflect emission light 90 (e.g., fluorescence). Laser light is passed through a short focal length condenser 77 to focus the light through the confocal pinhole 75. It will be appreciated that the light signal is maximum at focus such that light intensity as a function of objective Z location is maximum.

In various aspects, the sample analyzer further includes a processor in operable connection to the rotation assembly 20 and the optical assembly 30. The processor is operable to control movement of the rotation assembly 20, such as starting, stopping and continually rotating the planar substrate at continuous or variable rotational velocity. The processor is also operable to control movement of the planar substrate 40 in the Z direction such that the height of the plane of rotation 130 can be adjusted relative to the focal point 120. In certain aspects, the processor controls movement of the planar substrate 40 through mechanical movement of an engagement platform disposed on the drive shaft which secures the planar substrate 40 to the drive shaft such that rotational force from the drive shaft is transferred to the planar substrate 40.

In certain aspect, the height of the plane of rotation 130 is adjusted based on detected emission light. The processor includes functionality to determine when the focal point 120 coincides with a bottom of a sample well or when the focal point 120 coincides with a location within the well. Based on detected emission light, the processor may cause the rotation assembly 20 and thus the planar substrate 40 to move a distance in a direction parallel to the plane of rotation 130, or tilt the planar substrate 40 to alter the position of the plane of rotation 130 relative to the focal point 120, in addition to changing the height of the planar substrate 40 in the Z direction to adjust the position of the plane of rotation 130 relative to the focal point 120.

The sample analyzer 10 of the present disclosure is configured such that detected emission light from each well is recorded over time as the sample well passes through the focal point 120 upon each rotation and compiled to generate an image which can be utilized to make a measurement of the amount of analyte in a sample well. In adjusting the position of the focal point 120 relative to the sample well, the position of the sample well is changed while the position of the focal point remains constant, as opposed to the focal point 120 being moved to scan a sample. In certain aspects, the processor includes functionality to continually collect and process sequential measurements of detected emission light during rotation of the planar substrate 40 to generate an image specific to each sample well. The processor also includes functionality to quantitate an amount of an analyte within the reaction mixture based on the amount of detected emission light from a given sample well. Thus, the processor includes functionality to correlate sequential measurements of detected emission light with a given sample well.

The processor further includes functionality for automatically determining optimal focus, e.g., autofocusing, and causing the rotation assembly to move to an appropriate position such that the reaction mixture is coincident with the focal plane of excitation and simultaneously with the focal plane of the optical assembly including an imaging device. In certain aspects, this is accomplished by performing one or more focus scans as discussed further herein. Once the rotation assembly is in the appropriate position, analysis scans are performed which are utilized to generate an image for each sample well.

Figure 1:
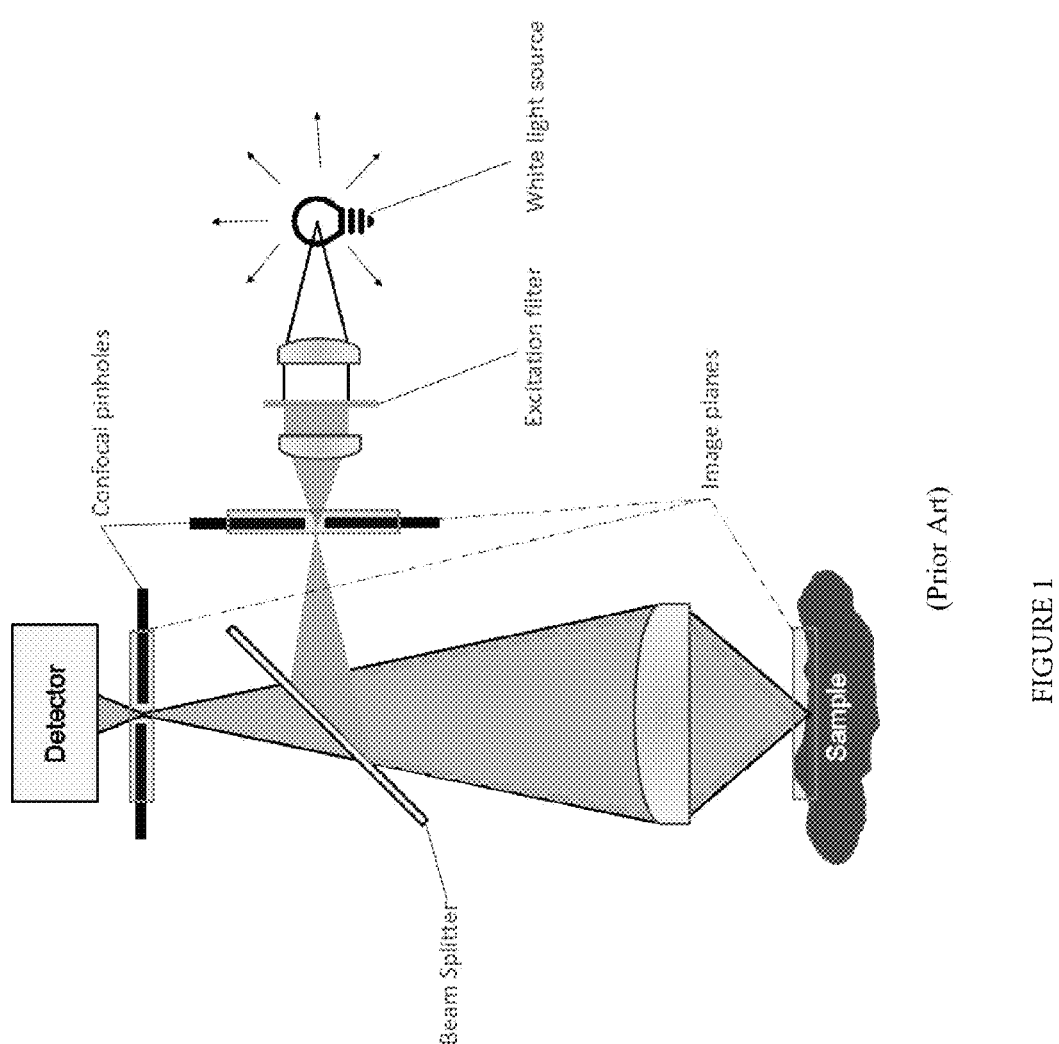
FIG. 1 is a side view of a traditional prior art confocal point imager.
Figure 2:
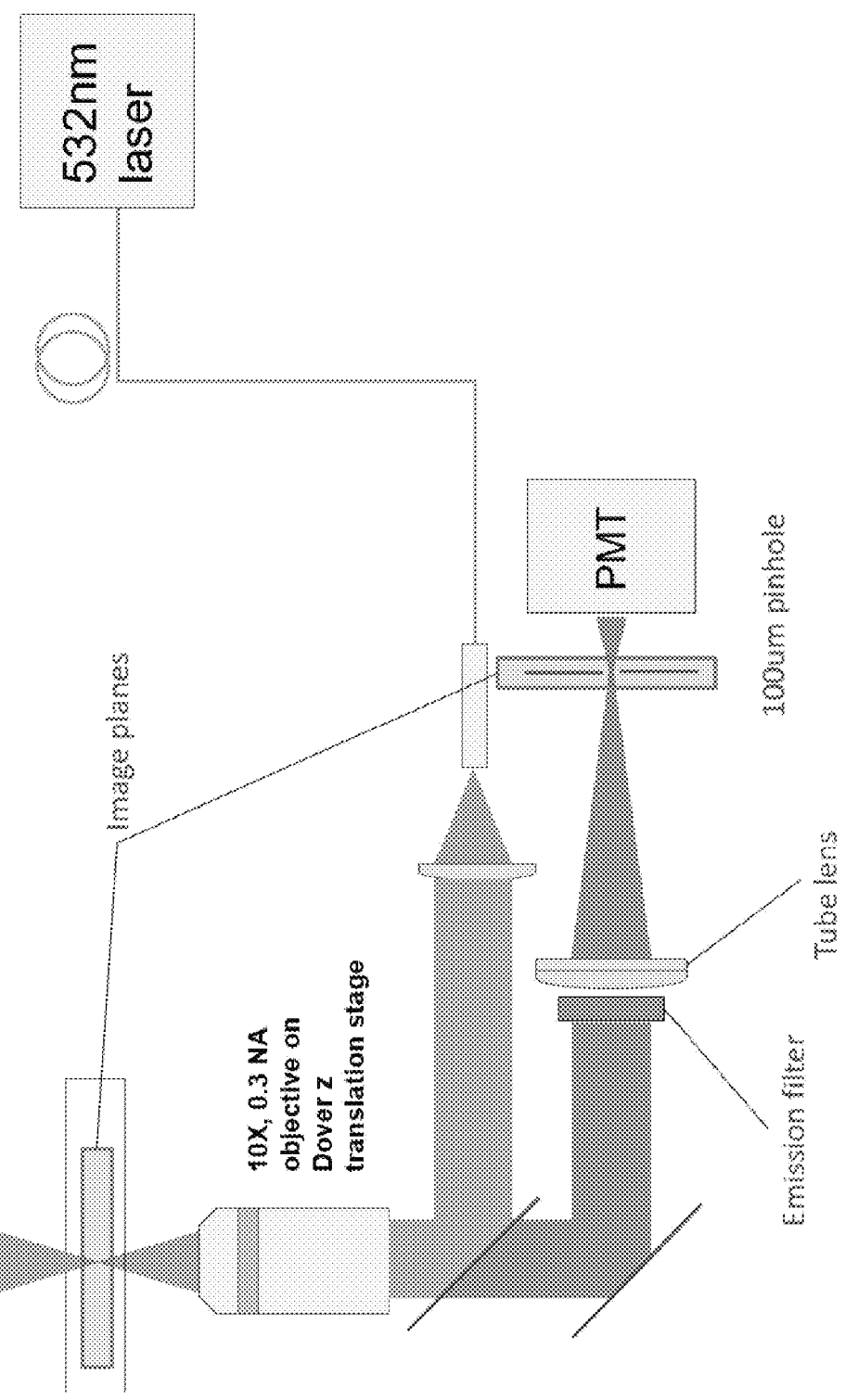
FIG. 2 is a side view of a confocal imager.

In various aspects, the excitation light 80 is emitted from the illumination source 100. In certain aspects, the is a fiber coupled laser. The fiber coupled laser provides convenience in locating the laser and its ancillaries, but other light sources may be utilized. A free space laser can supply the excitation light at potentially less cost, better beam quality, and fewer ancillaries to accommodate. An incoherent light source as shown in FIG. 1, whether incandescent, LED, or other, could save even more cost.

In some aspects, the sample analyzer of the present disclosure may further include one or more imaging devices operably coupled to the processor and/or the optical assembly. As used herein, an imaging device include any device or detector capable of capturing an image including, but not limited to a camera, CCD camera, photodiode, photomultiplier tube, laser scanner and the like.

Most confocal imagers place scanning mirrors between the dichroic and the objective (called the scan head) to enable scanning the laser and de-scanning the image. The present sample analyzer, instead, relies on moving the sample in a known way while keeping the scanning voxel in a fixed position. This is meaningful for a field deployed system as the absence of the scan head greatly bolsters the robustness of the optical system. Not only are there fewer moving parts, but the optical system is also less susceptible to vibrations overall. Mirrors in scan-heads are typically very small and light since they need to rapidly accelerate and decelerate for fast image scans. Since these small and light mirrors are held into the optical path by a small shaft extending from a galvo, they are prone to vibrations. This is one of the primary reasons that confocal imagers with scan heads are typically installed with any number of anti-vibration technologies, such as an air table, piezo feet, and the like.

In contrast, using the analyzer and scanning methodology described herein, detection images are constructed by moving the sample which makes the analyzer much more capable of field deployment without special anti-vibration technologies. Further, the sensitivity to vibration is coupled to the planar substrate which is less likely to exhibit vibrations since it is heavy, spinning, and firmly secured to the drive shaft. Typically, this approach would not be utilized because it may reduce reliable resolution of the detection images via excess motor movement. However, the present analyzer is primarily intended to discern precise brightness as opposed to discerning precise shape of an object.

In certain aspects, the optical assembly includes an objective lens 70 in the illumination source light path. In some aspects, the assembly is configured such that a back aperture of the objective lens 70 is under filled.

Most confocal imagers attempt to fill the back aperture of the objective with the excitation light, e.g., laser. The primary purpose is to maximize the power density of the light at the focal volume of the imager. However, this means that the system must maintain very tight tolerances and is not desirable in a system having a dynamic environment such as that of the present disclosure in which a planar substrate is being rotated at varying rotational velocities.

In various aspects, the rotation assembly is operable to start, stop, or continually rotate a substrate within a plane of rotation at constant or varying rotation velocity. In some aspects, the rotational motor is operable to start, stop or vary rotational velocity of the planar substrate between about 0 to 12,000 revolutions per minute (RPMs), including about 1,000, 2,000, 3,000, 4,000, 5,000, 6,000, 7,000, 8,000, 9,000, 10,000, 11,000 or 12,000.

In various aspects, the optical assembly is configured such that the back aperture is under filled and has an under fill ratio (diameter of back aperture:light beam waist diameter) of greater than about 4, 5, 6, 7, 8, 9, 10, 11 or 12. In one aspect, the diameter of the back aperture is between about 8 to 12 mm and the laser beam waist is between about 0.5 to 3 mm. For example, the diameter of the back aperture is about 8, 8.5, 9, 9.5, 10, 10.5, 11, 11.5 or 12 mm and the laser beam waist diameter is about 0.5, 1, 1.5, 2, 2.5 or 3 mm. In another aspect, the diameter of the back aperture is about 9, 9.1, 9.2, 9.3, 9.4 9.5, 9.6, 9.7, 9.8, 9.9 or 10 mm and the laser beam waist diameter is about 0.8, 0.9, 1, 1.1, 1.2, 1.3, 1.4 or 1.5 mm. In another aspect, the diameter of the back aperture is between about 9.3 to 9.9 mm and the laser beam waist has a diameter of between about 1 to 1.4 mm and the under fill ratio is between about 7 or 9. In another aspect, the diameter of the back aperture is about 9.6 mm and the laser beam waist has a diameter of about 1.2 mm and the under fill ratio is about 8.

Under filling the back aperture allows the presently disclosed sample analyzer to be more robust against vibrations, bumps, and small misalignments. The simple reason for this is that the under filled excitation light provides a very large and even illumination around the collection voxel 140 (See FIG. 5). A large excitation spot 145 size in tandem with a larger than typical pinhole gives the entire optical assembly more tolerance in alignment variability and more robustness against vibration or random perturbations of system components. This extends to all parts in the optical assembly.

In certain aspects, the ability to maintain robustness in a dynamic as with the present sample analyzer is done by choosing a larger pinhole than orthodox would otherwise dictate and by under filling the back aperture with the excitation light. By way of illustration, for the embodiment shown in FIG. 5, the excitation spot 145 size may be calculated by first calculating the effective NA of the excitation optics. Rearranging equation 1 from above gives:

$$NA_{excitation} = \frac{\text{Back Aperture diameter}_{excitation}}{2 * \text{effective Focal Length}} = \frac{1.2 \text{ mm}}{2 * 16 \text{ mm}} = 0.0375 NA$$

Considering that the excitation beam waist is 8 times smaller than the objective back aperture pupil, the effective excitation NA would be the NA of the objective divided by 8 (0.3/8=0.0375).

Now, with the effective NA of the excitation laser and the focal length of the objective, we can calculate the excitation spot size:

$$\text{Spot Diameter} = 1.22 * \frac{\lambda}{NA} = 1.22 * \frac{(0.532 um)}{0.0375} = 17.3 um$$

Figure 6:
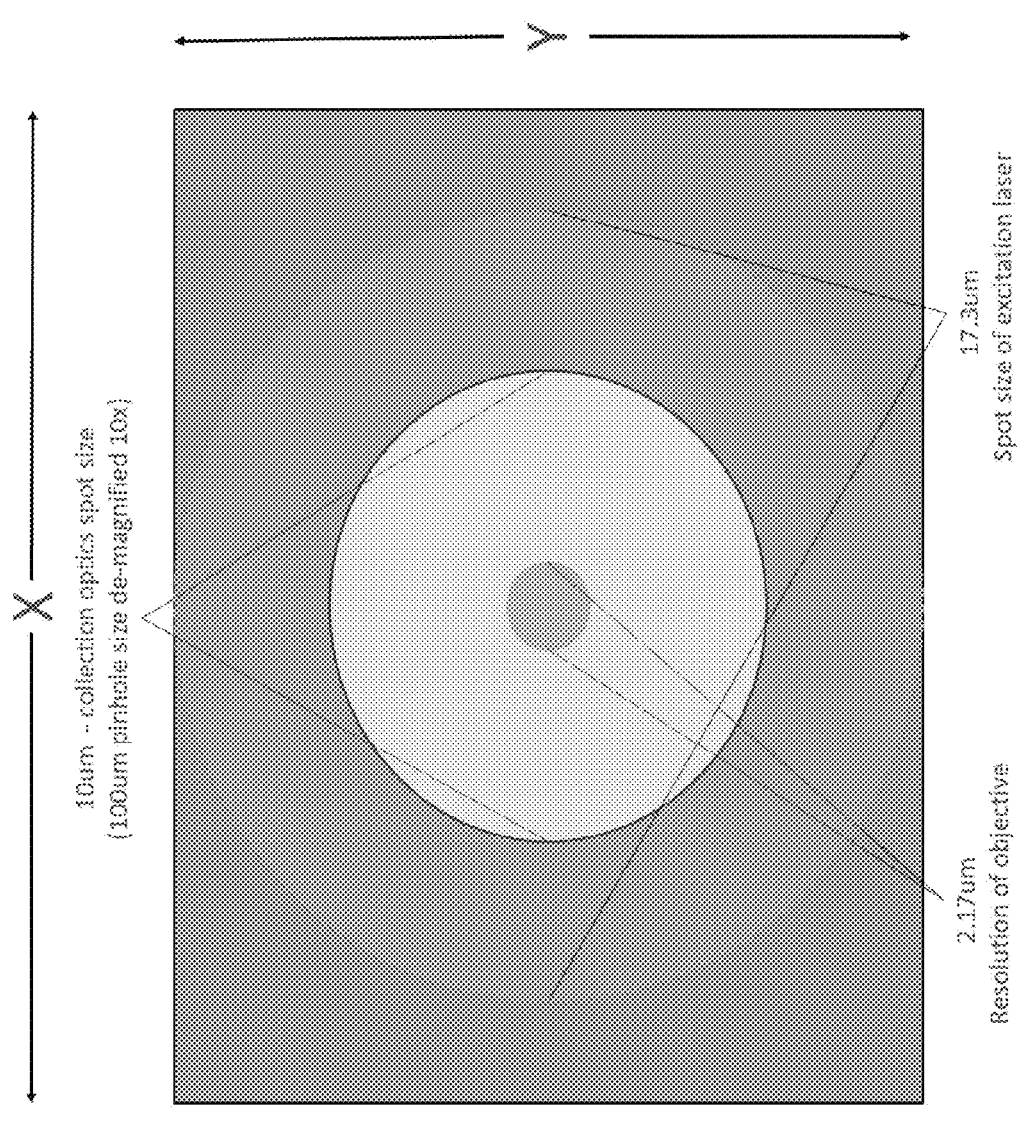
FIG. 6 shows the image plane at the sample of the optical assembly shown in FIG. 5.
Figure 7:
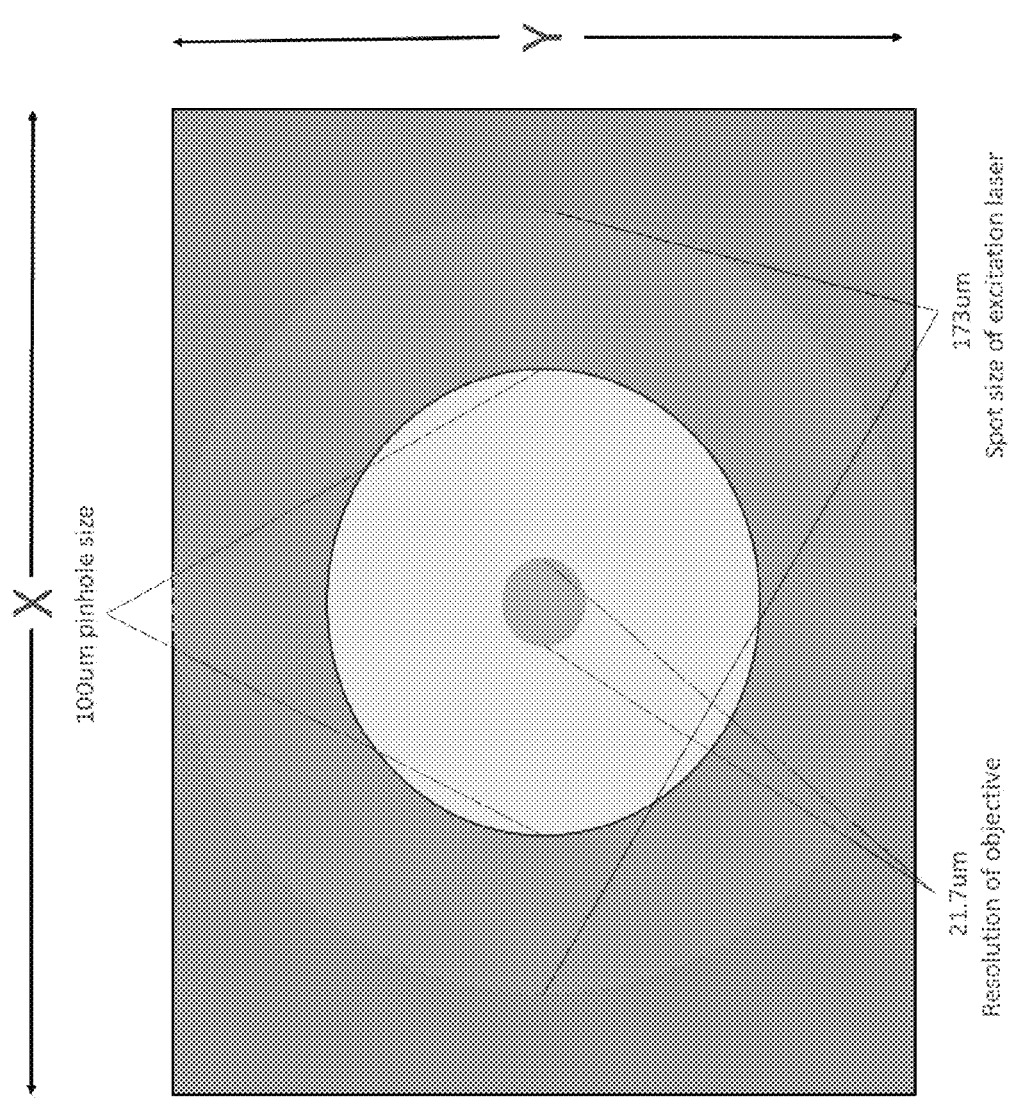
FIG. 7 shows the image plane at the pinhole of the optical assembly shown in FIG. 5.

FIGS. 6 and 7 show the image plane at the sample and pinhole, respectively, produced using the configuration shown in FIG. 5. As evidenced in the FIGURES, in addition to being much larger, the excitation spot size is also much more homogenous than it would otherwise be for a filled aperture. The added tolerance also extends to the axial dimension (Z). The laser spot size in the axial dimension is on the order of 80 um while the collection spot size is only on the order of 20 um. All of this gives rise to an optical assembly that can vary its alignment with little to no drop in signal from the sample.

Figure 15:
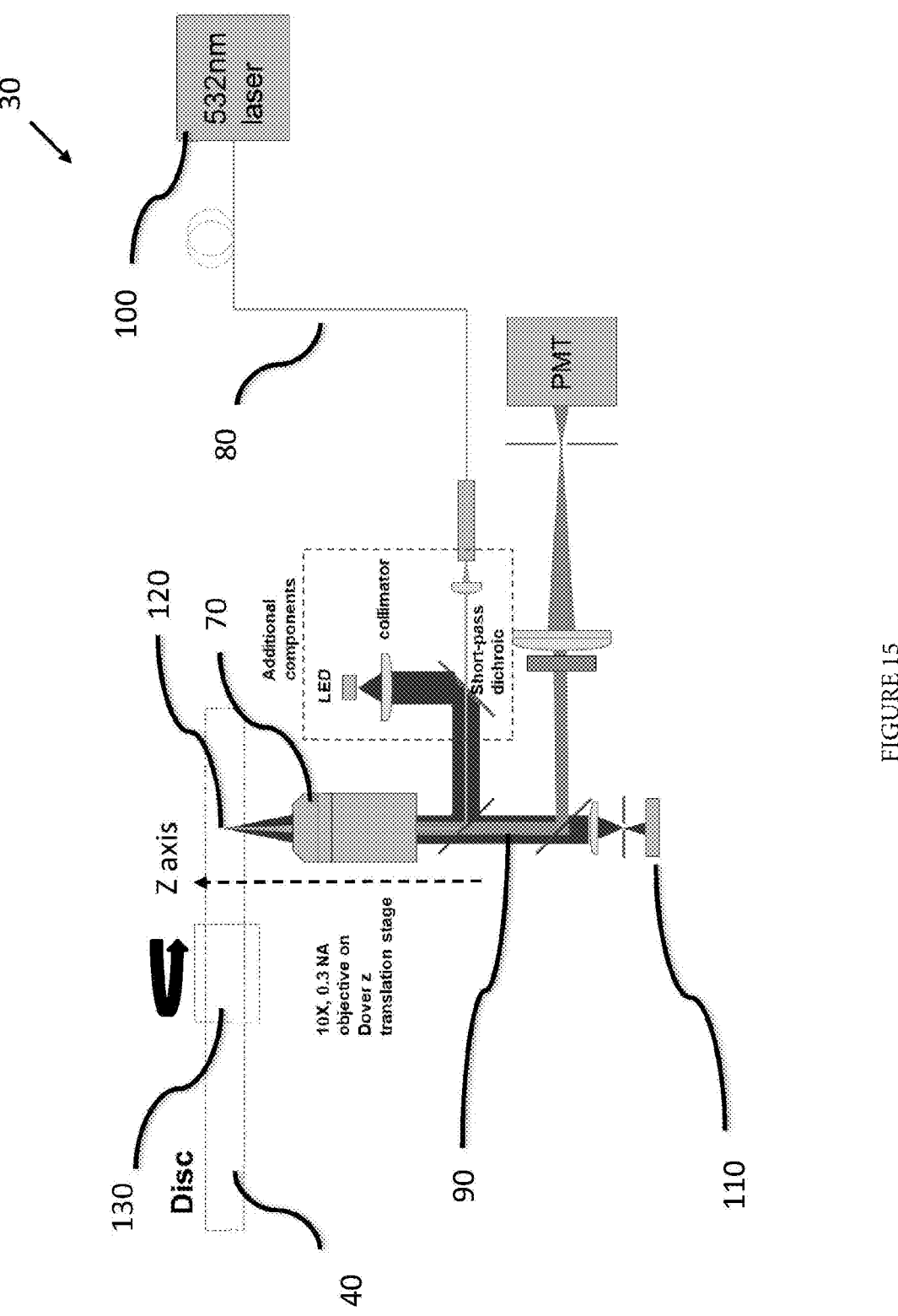
FIG. 15 is a schematic showing the architecture of an optical assembly of the disclosure in one aspect of the invention.

FIG. 15 show an optical assembly in certain aspects of the invention which utilizes second light source filled back-aperture reflectance. The assembly utilizes similar optical principles as the assembly depicted in FIGS. 4 and 5, but input diameter constraints prevent the excitation laser from always filling the objective lens 70 back aperture and achieving sufficient z-resolution. A second beam of light (LED) is introduced that fills the back aperture and uses the full NA of the objective lens 70.

Figure 16:
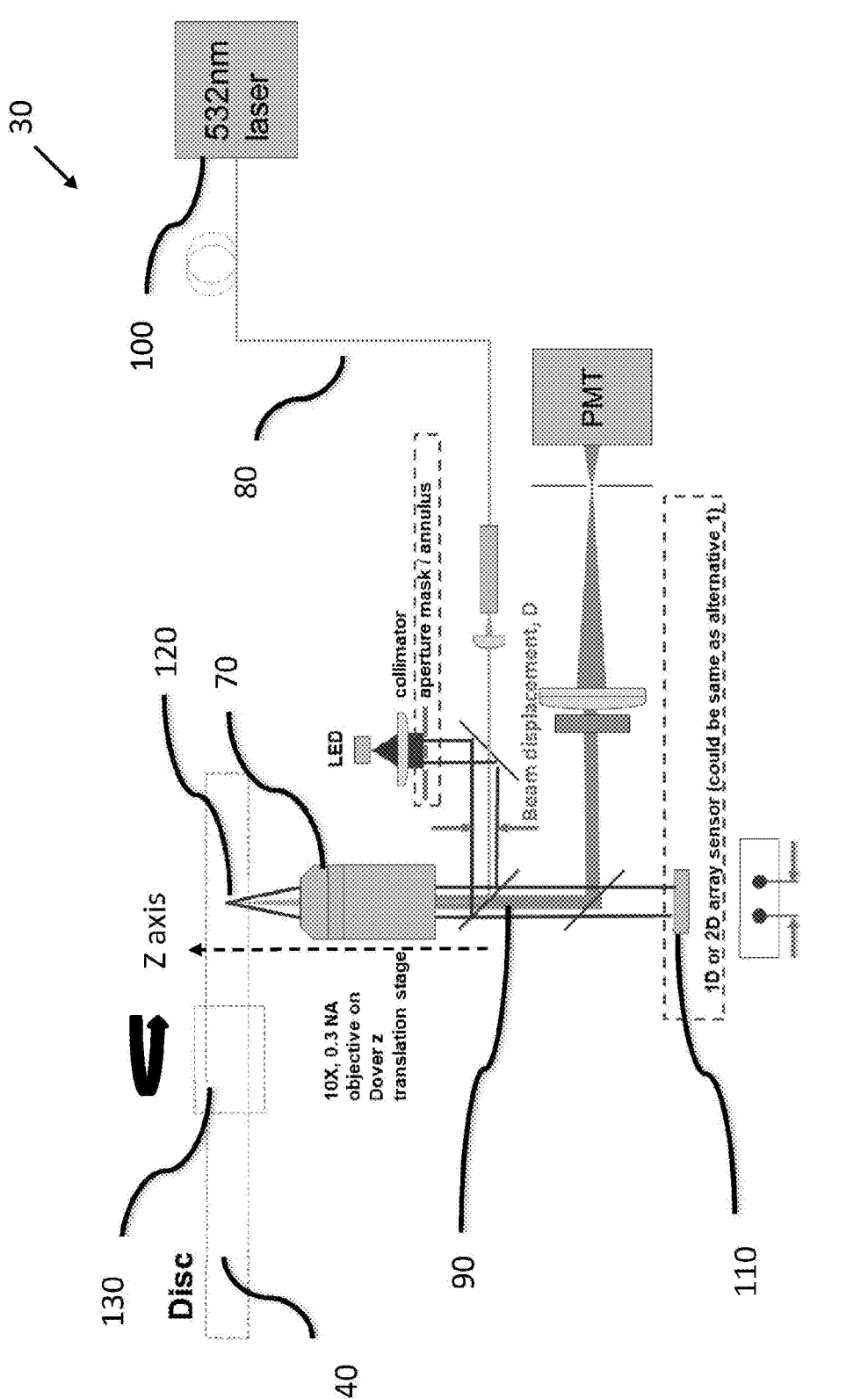
FIG. 16 is a schematic showing the architecture of an optical assembly of the disclosure in one aspect of the invention.

FIG. 16 show an optical assembly in certain aspects of the invention which utilizes off-axis dual beam (or ring beam) displacement. During operation, two off-axis beams produced by directing collimated second wavelength LED through an aperture mask are directed into the objective lens 70 parallel to (but radially offset from) the optical axis. The distance between their collimated reflections can be calibrated to a nominal separation at focus. In some aspects, imaging can be on a 1D or 2D sensor array (or 2 point sensors at the expected separation). Beam displacement (D) as a function of objective Z position is maximum.

Figure 17:
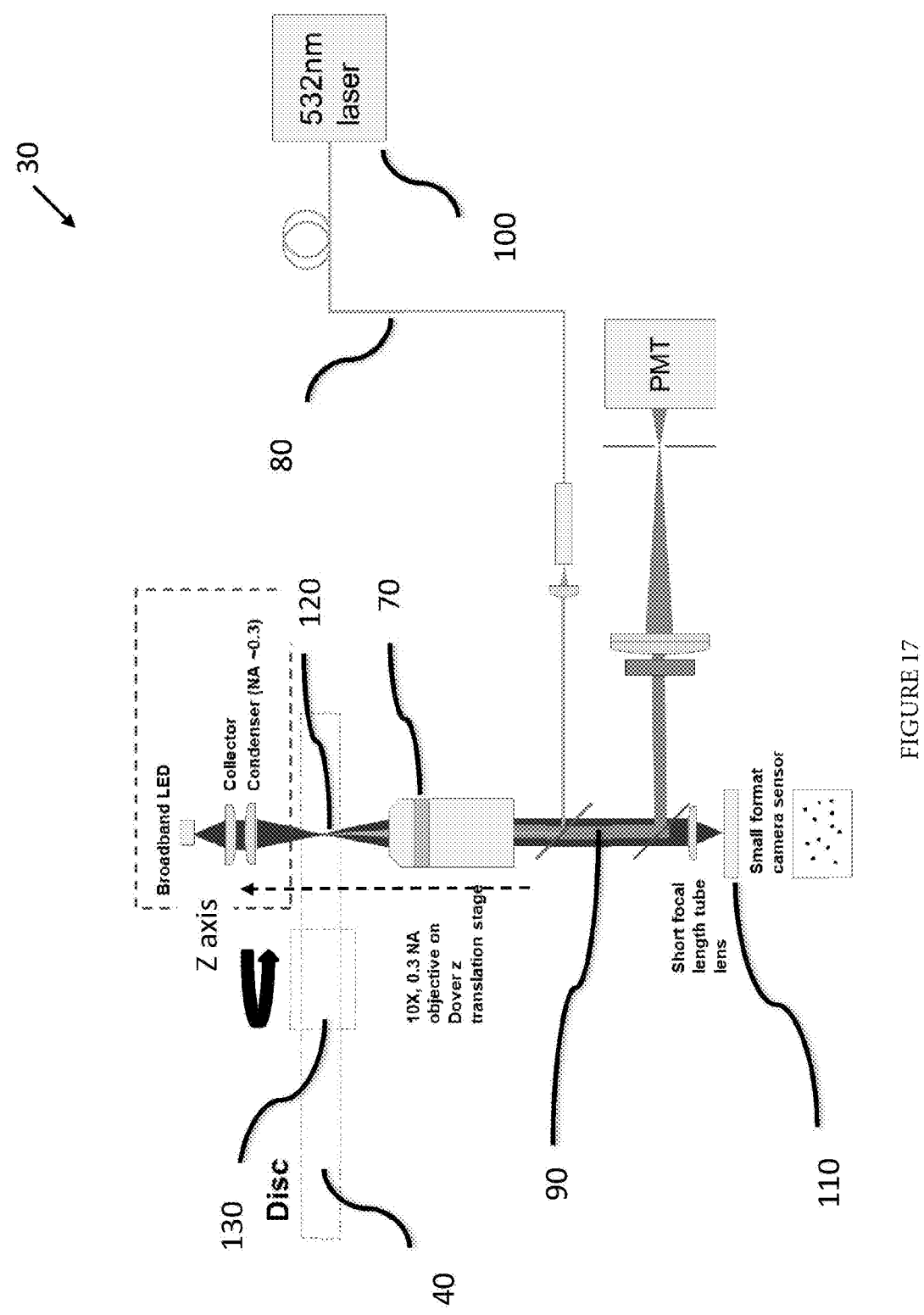
FIG. 17 is a schematic showing the architecture of an optical assembly of the disclosure in one aspect of the invention.

FIG. 17 shows an optical assembly in certain aspects of the invention which utilizes brightfield imaging bead contrast. Conventional wide field illumination and imaging onto a sensor enables detection of fluorescent beads within a well of the planar substrate directly and can be used as a focus metric based on image contrast as shown in FIG. 17. Image contrast as a function of objective Z position is maximum. A short focal length is used which minimizes magnification so that small format sensors capture a large field of view.

In various aspects of the invention, the rotation assembly is configured to rotate a planar substrate having one or more sample wells disposed within the perimeter of the planar substrate. In certain aspect, the planar substrate includes a plurality of wells, thereby defining a multiwell plate. In some aspects, the multiwell plate can facilitate the parallel performance of two or more different assay formats (e.g., a fluorescence and absorbance based format) or to facilitate the performance of different assays for two or more different analytes in a sample (e.g., a high-abundance and a low-abundance analyte). Each different well can differ with respect to one or more properties affecting the performance of an assay, e.g., a biochemical assay or a cell-based assay, such as an optical property, geometry or shape, dimension, surface property, or assay reagent content. Typically, the properties of the different wells are selected to improve the performance of a specific assay format or of an assay of a given format for a specific analyte.

As used herein, the term "well," when used in connection with the planar substrate provided herein, refers to a well for performing an analytical assay to determine the concentration of an analyte of interest. In this context the term "well" is used synonymously with "assay well" and "sample well."

The different wells on a multiwell plate can differ with respect to any property affecting the performance of an assay. The performance of an assay can be affected, e.g., with respect to the assay's sensitivity of analyte detection (e.g., lower limit of detection), robustness (e.g., Z-factor), signal intensity (e.g., absolute signal or relative to a positive or negative control), background signal (e.g., signal of a negative control well without analyte of interest), signal-to-noise ratio (S/N), signal variability (e.g., standard deviation of positive or negative control wells), reproducibility, temperature or light-sensitivity, sensitivity to interference from certain chemicals (e.g., fluorescent compounds, colored compounds, oxidizing or reducing compounds, detergents) or another factor.

In some aspects, the property of a well affecting the performance of an assay includes the well geometry (e.g., cube, rectangular cuboid or rectangular prism, sphere, cylinder, (inverted) pyramid, (inverted) cone, flat bottom, conical bottom, and the like), a well dimension (e.g., height, length, depth, or volume), an optical property of the well (e.g., light transparency or color), a surface property (e.g., high-binding (e.g., high protein-binding, high nucleic acid-binding), low-binding (e.g., low protein-binding, low nucleic acid-binding, beads in wells), cell-adhesion or cell-proliferation promoting, porous (e.g., glass filter or PVDF membrane) or non-permeable), temperature (e.g., room temperature, elevated or reduced temperature), or assay reagent content (e.g., assay reagents dried in a well or assay reagents in solution).

Two or more wells can be arranged on a multiwell plate in a variety of different arrangements. In some embodiments, the wells are arranged in columns and rows (e.g., forming a rectangle or a square). In some aspects, the wells are arranged in a circle or concentric circles arranged about the center of the circle. In some embodiments, the arrangement of the wells on the multiwell plate is encoded on a barcode (e.g., a two- or three dimensional barcode) on the multiwell plate.

Figure 8:
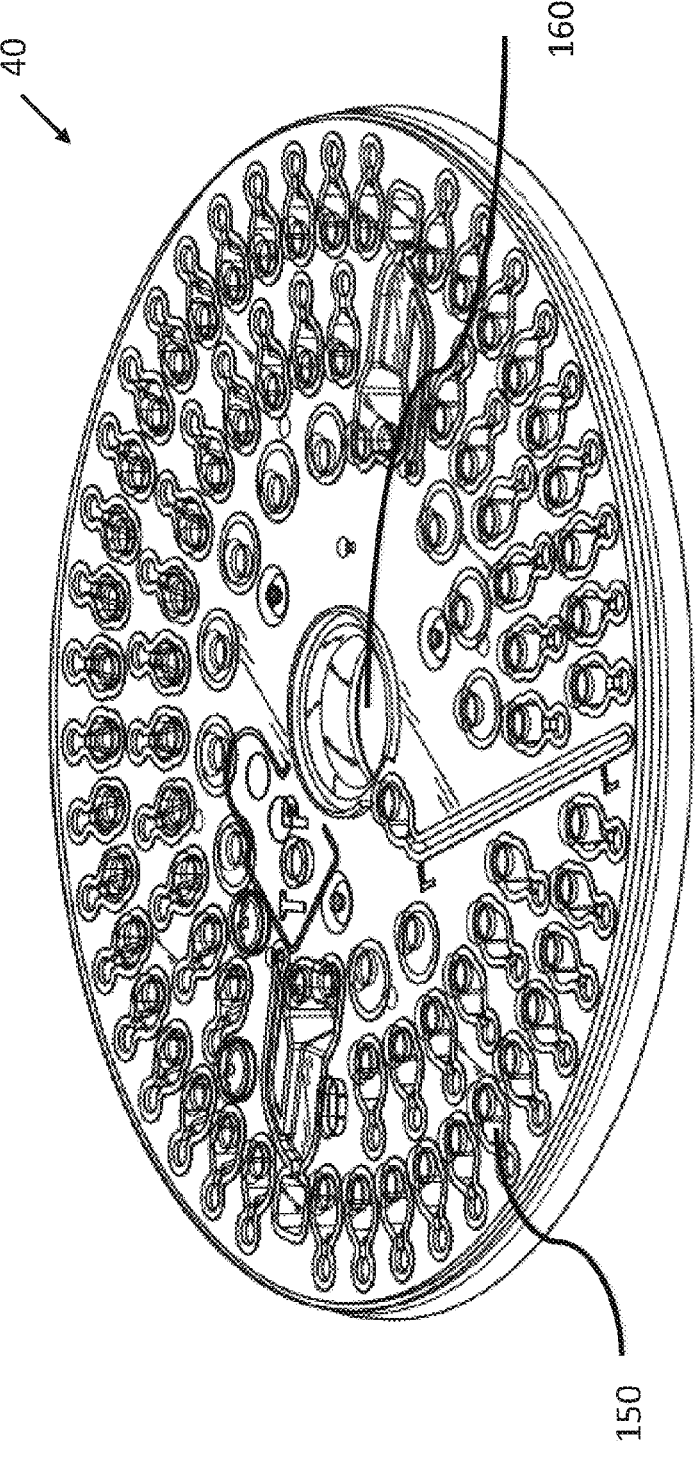
FIG. 8 is a perspective view of a planar substrate shaped as a disc having sample wells arranged in concentric rings radially about the circumference of the disc in one aspect of the invention.
Figure 9:
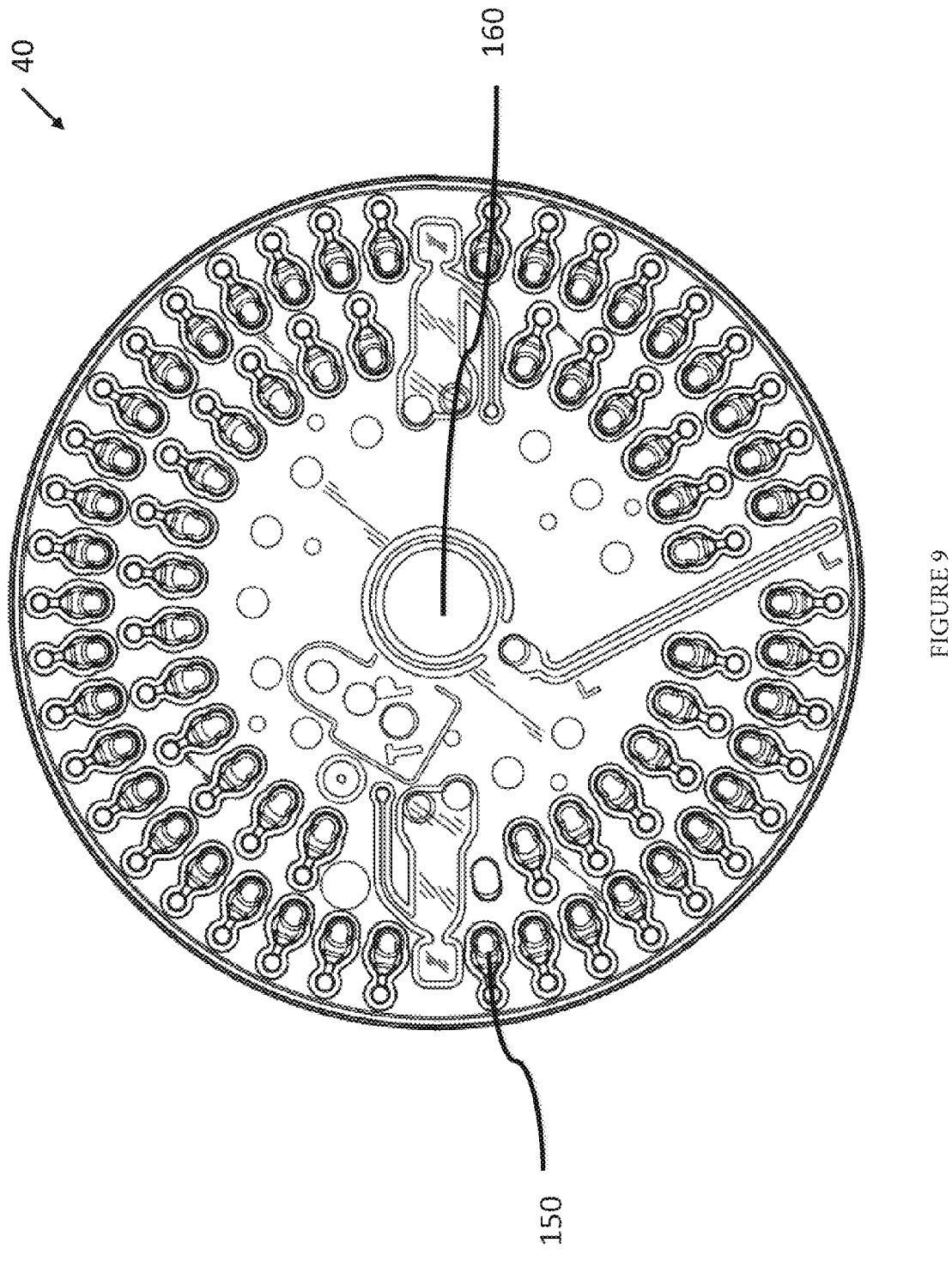
FIG. 9 is a top view of the planar substrate depicted in FIG. 8.
Figure 10:
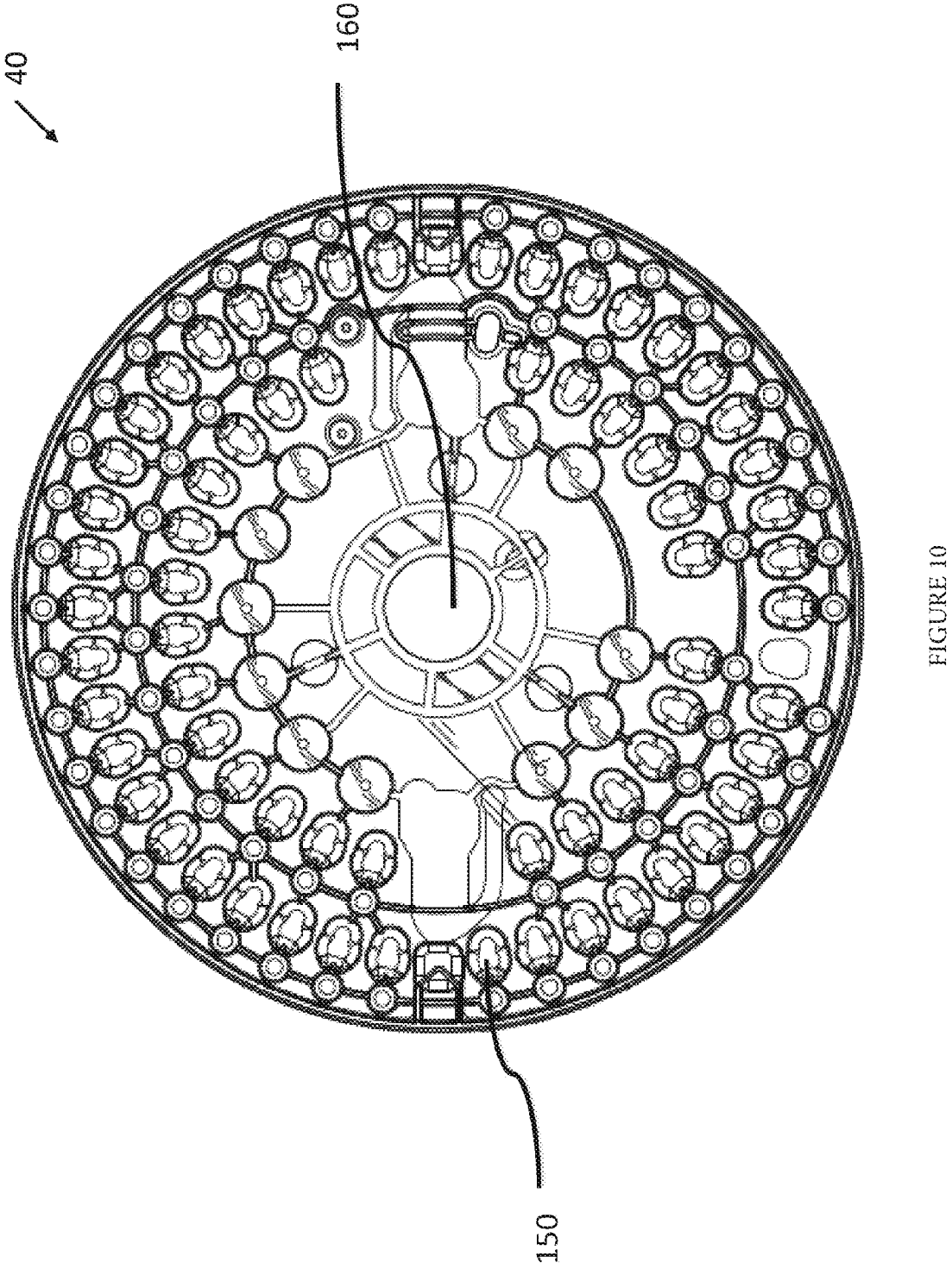
FIG. 10 is a bottom view of the planar substrate depicted in FIG. 8.
Figure 11:
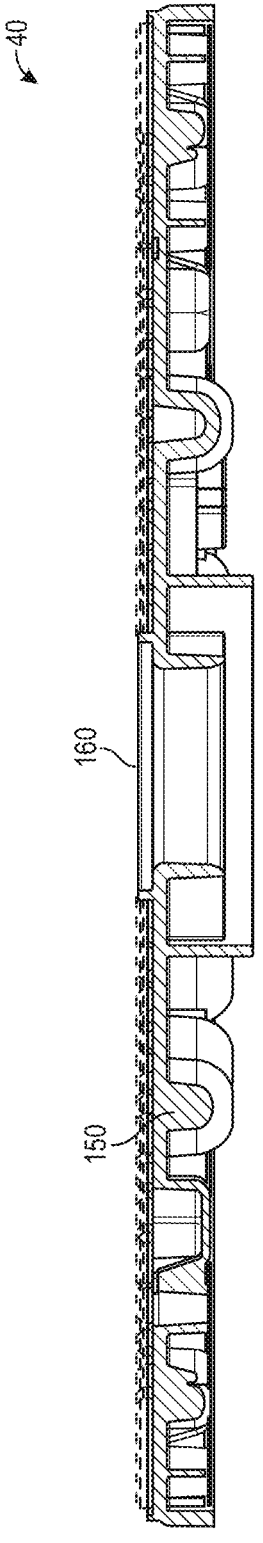
FIG. 11 is a cross-sectional view across the height and though the center of the planar substrate depicted in FIG. 8.

FIGS. 8-11 illustrate a planar substrate 40 for use with the sample analyzer in one aspect of the present disclosure. The planar substrate 40 is shaped as a disc and has a multiwell format for performing different assays simultaneously. The disc includes a plurality of sample wells 150, each configured to hold a reaction mixture including a sample and reagent. As shown in FIGS. 8-10, the sample wells 150 are disposed within the circumference of the disc about the radius. A central through hole 160 is disposed in the center of the disc. As shown in FIGS. 8-10, the sample wells 150 are arranged in concentric circles about the circumference of the disc such that as the disc is rotated about the plane of rotation, the focal point passes through each sample well so that emission light can be detected from each sample well 150. In this manner, emission light from each sample well 150 can be continuously detected and recorded as the disc is rotated in the plane of rotation 130 thereby allowing for an image to be generated corresponding to each sample well 150.

While the present disclosure illustrates use of a disc shaped planar substrate, it will be appreciated that the planar substrate can be any geometric shape in which a sample well may be included and rotated. For example, the planar substrate may be any polygonal shape when viewed along the rotational axis such as, by way of illustration but in no way limiting, a triangle, square, rectangle, pentagon, hexagon, heptagon, octagon, nonagon, decagon, dodecagon and so forth. Similarly, it will be appreciated that the planar substrate may be arcuate or special shape when viewed along the rotational axis, such as, by way of illustration but in no way limiting, a circle, irregular circle or ellipse. Further it will be appreciated that the perimeter of the planar substrate when viewed along the rotational axis may include any number of arcuate portions, straight portions, grooves or recesses.

In some aspects, the planar substrate 40 includes a plurality of wells configured for an absorbance-based assay and/or a fluorescence-based assay. Wells configured for an absorbance-based assay can include, e.g., a clear or translucent bottom.

In some aspects, the planar substrate may include 2 or more, 3 or more, 4 or more, 5 or more, 6 or more, 7 or more, 8 or more, 9 or more, 10 or more, 15 or more, 20 or more, 25 or more, 30 or more, 35 or more, 40 or more, 45 or more, 50 or more, 60 or more, 70 or more, 80 or more, 90 or more, or 100 or more wells.

In certain aspects, a planar substrate provided herein includes a "clear" or "translucent" bottom in one or more wells. As used herein, the terms "clear" or "translucent" are used to describe a material that at least partially transmits light of a wavelength of interest in a ultraviolet or visible range, e.g., between 220 nm and 850 nm, between 300 nm-850 nm, between 400 nm-800 nm, or between 300 nm-700 nm. By contrast, a material referred to herein as "opaque" or "solid" (e.g., solid black or solid white) is a material that transmits essentially no light of a wavelength of interest in the ultraviolet or visible range. In some aspects, a clear or translucent well or multiwell plate bottom transmits at least 1%, at least 3%, at least 5%, at least 10%, at least 20%, at least 30%, at least 40%, at least 50%, at least 60%, at least 70%, at least 80%, or at least 90% of light hitting the surface of the bottom in the sample analyzer provided herein. In some aspects, at least 1%, at least 3%, at least 5%, at least 10%, at least 15%, at least 20%, at least 25%, at least 30%, at least 40%, at least 50%, at least 60%, at least 70%, at least 80%, at least 90%, at least 95%, or 100% of wells of the multiwell plate include a clear or translucent bottom. In some aspects, some or all of the wells on the peripheral circle of wells on a circular multiwell plate include a clear, or translucent bottom. In some aspects, only wells on the peripheral circle of wells on a circular multiwell plate comprise a clear or translucent bottom.

In certain aspects, an inner surface of a sample well of the planar substrate, may be functionalized. A surface may be referred to as "functionalized" when it includes a linker, a scaffold, a building block, or other reactive moiety attached thereto, whereas a surface may be "nonfunctionalized" when it lacks such a reactive moiety attached thereto.

A functionalized surface may refer to a surface having a functional group. A functional group may be a group capable of forming an attachment with another functional group. For example, a functional group may be biotin, which may form an attachment with streptavidin, another functional group. Illustrative functional groups may include, but are not limited to, aldehydes, ketones, carboxy groups, amino groups, biotin, streptavidin, nucleic acids, small molecules (e.g., for click chemistry), homo- and hetero-bifunctional reagents (e.g., N-succinimidyl(4-iodoacetyl) aminobenzoate (STAB), dimaleimide, dithio-bis-nitrobenzoic acid (DTNB), N-succinimidyl-S-acetyl-thioacetate (SATA), N-succinimidyl-3-(2-pyridyldithio) propionate (SPDP), succinimidyl 4-(N-mafeimidomethyl)-cyclohexane-1-carboxylate (SMCC) and 6-hydrazinonicotimide (HYNIC), and antibodies. In some instances, the functional group is a carboxy group (e.g., COOH).

The functional groups on a surface may be different for different regions of the surface. The functional groups on the surface may be the same for all regions of the surface. For example, the entire internal surface of a sample well may include the same functional group. Alternatively, different regions of the internal surface of a sample well may include different functional groups. Further, only portions of a surface may include functional groups.

Addition of functional groups to a surface may be utilized to form capture regions on the surface to immobilize or bind an analyte. In this manner, a specific analyte may be concentrated at a specific region of the surface to increase detection and/or analysis of the analyte. In one aspect, the inner surface of a well is functionalized to include an antigen or probe for binding an analyte. In another aspect, the inner surface of a well is functionalized to capture a bead optionally having a fluorescently labeled moiety to improve capture efficiency, spacing (for resolution and imaging purposes) and or control density. This may also be accomplished through other types of capture mechanisms, such as physical texturing or chemical based capture.

Functionalizing the surface of a well allows for use of inclusion of structures such as gold or silver nanoparticles to enhance the intensity of the emitted radiation for the reaction mixture. This is advantageous to the system architecture as it would reduce optical power requirements and enable use of lower cost light sources.

In some aspects, the multiwell plate includes one or more pluralities of wells configured for an absorbance based assay and one or more different pluralities of wells configured for a fluorescence based assay. In some aspects, one or more pluralities of wells configured for the absorbance based assay are arranged in a circle of wells on the periphery of a circular (e.g., disk shaped) multiwell plate. In some aspects, the wells arranged on the periphery of a circular multiwell plate have a diameter of between 0.5 mm and 3.0 mm (e.g., 1.5 mm). In some aspects, the wells arranged on the periphery of the circular multiwell plate include between about 1 to 8, 12, 24 or 48 wells, or between about 36 to 48 wells. In some aspects, the one or more pluralities of wells configured for an absorbance based assay include one or more pluralities of wells configured for a cell-based assay (e.g., RBC assay). In some aspects, the one or more pluralities of wells configured for an absorbance based assay include one or more pluralities of wells configured for a biochemical assay. In some aspects, the one or more pluralities of wells configured for a biochemical assay include one or more pluralities of wells configured for a homogeneous assay (e.g., protein detection, such as general protein absorbance (280 nm) or hemoglobin absorbance 540 nm-600 nm range (e.g., hemoglobin, oxyhemoglobin, carboxyhemoglobin, methemoglobin)). In some aspects, the one or more pluralities of wells configured for a biochemical assay include one or more pluralities of wells configured for a heterogeneous assay (e.g., ELISA). In some aspects, the one or more pluralities of wells configured for a fluorescence-based assay include one or more pluralities of wells configured for a fluorescence-based cellular assay. In some aspects, the fluorescence-based cellular assay can assay suspension cells, cells adhered to beads, or cells adhered to a well bottom. In some aspects, the one or more pluralities of wells configured for a fluorescence-based assay include one or more pluralities of wells configured for a fluorescence-based biochemical assay. In some aspects, the one or more pluralities of wells configured for a fluorescence-based biochemical assay include one or more pluralities of wells configured for a homogeneous fluorescence-based biochemical assay (e.g., an enzymatic substrate-turnover assay). In some aspects, the one or more pluralities of wells configured for a fluorescence-based biochemical assay include one or more pluralities of wells configured for a heterogeneous fluorescence-based biochemical assay (e.g., ELISA). In some aspects, the heterogeneous fluorescence-based biochemical assay involves analyte binding to a bead surface or well surface.

In some aspects, the multiwell plate includes one or more pluralities of wells configured for a cell-based assay and one or more different pluralities of wells configured for a biochemical assay. In some aspects, the one or more pluralities of wells configured for a cell-based assay include one or more pluralities of wells configured for a fluorescence-based cellular assay. In some aspects, the fluorescence-based cellular assay can assay suspension cells or cells attached to the surface of a bead or well. In some aspects, the one or more pluralities of wells configured for a cell-based assay include one or more pluralities of wells configured for an absorbance-based cellular assay. In some aspects, the one or more pluralities of wells configured for a biochemical assay include one or more pluralities of wells configured for a homogeneous biochemical assay. In some aspects, the one or more pluralities of wells configured for a homogeneous biochemical assay include one or more pluralities of wells configured for a homogeneous fluorescence-based biochemical assay. In some aspects, the one or more pluralities of wells configured for a homogeneous biochemical assay include one or more pluralities of wells configured for a homogeneous absorbance-based biochemical assay. In some aspects, one or more pluralities of wells configured for a biochemical assay include one or more pluralities of wells configured for a heterogeneous biochemical assay. In some aspects, the plurality of wells configured for a heterogeneous biochemical assays include one or more pluralities of wells configured for a fluorescence-based heterogeneous biochemical assay. In some aspects, the one or more pluralities of wells configured for a heterogeneous biochemical assay include one or more pluralities of wells configured for an absorbance-based heterogeneous biochemical assay. In some aspects, one or more of the pluralities of wells configured for an absorbance based assay are arranged in a circle of wells on the periphery of a circular (e.g., disk shaped) multiwell plate. In some aspects, the wells arranged on the periphery of a circular multiwell plate have a diameter of between about 0.5 mm and 3.0 mm (e.g., 1.5 mm). In some aspects, the wells arranged on the periphery of the circular multiwell plate include between about 1 to 8, 12, 24 or 48 wells, or between about 36 to 48 wells.

In some aspects, the multiwell plate includes two or more different pluralities of wells configured to analyze two or more analytes selected from a small molecule analyte (e.g., a monosaccharide, fatty acid, salt, drug), a large molecule analyte (e.g., a protein, phospholipid, nucleic acid), and a cell (e.g., a red blood cell, a white blood cell).

In some aspects, the multiwell plate includes one or more pluralities of wells configured for an assay for detecting a cell (e.g., RBC, WBC, circulating cancer cell (CTC), bacterial cell), and one or more different pluralities of wells configured for an assay for detecting a large molecule analyte (e.g., a protein analyte). In some aspects, the multiwell plate includes one or more pluralities of wells configured for an assay for detecting a cell (e.g., a RBC, a WBC, a circulating cancer cell (CTC), a bacterial cell), one or more different pluralities of wells configured for an assay for detecting a large molecule analyte (e.g., a protein analyte), and one or more different pluralities of wells configured for an assay for detecting a small molecule analyte (e.g., glucose or cholesterol).

In some aspects, the multiwell plate includes one or more pluralities of wells configured for an assay for detecting a high abundance analyte (e.g., albumin, glucose or a RBC) and one or more different pluralities of wells configured for an assay for detecting a medium- or low-abundance analyte (e.g., tumor necrosis factor alpha or a CTC).

In some aspects, the multiwell plate has a circular shape (e.g., disc shape) or an ellipsoid shape. In some aspects, the multiwell plate has a square or rectangular shape.

In some aspects, one or more of the different pluralities of wells include one or more reagents for a biochemical assay. In some aspects, the biochemical assay includes turnover of an enzyme substrate. In some aspects, the biochemical assay includes binding of a binding reagent (e.g., antibody) to an analyte of interest (e.g., insulin, cytokine, or the like). In some aspects, reagents for a biochemical assay include an enzyme or an enzyme substrate. In some aspects, the enzyme substrate is a fluorescent substrate (i.e., a substrate that can change its fluorescence properties as a result of enzyme-mediated turnover). In some aspects, the enzyme substrate can change its absorbance characteristics in the ultraviolet (e.g., 200 nm-400 nm) or visible spectrum (e.g., 350 nm-850 nm) as a result of enzyme-mediated turnover. In some aspects, the biochemical assay is a binding assay (e.g., sandwich-immune assay, ELISA, or the like). In some aspects, the biochemical assay is a competition assay (e.g., immunoassay for a steroid hormone). In some aspects, the biochemical assay is a homogeneous assay (e.g., (TR-) FRET assay, enzyme-substrate turnover assay, or the like). In some aspects, the biochemical assay is as heterogeneous assay (e.g., ELISA). In some aspects, the biochemical assay is a kinetic assay (e.g., continuous-read or intermittent-read). In some aspects, the biochemical assay is an endpoint assay. In some aspects, the biochemical assay reagent is coated on the surface of a plurality of wells (e.g., a capture or binding reagents, such as an antibody, streptavidin, protein A, protein G, aptamer, oligonucleotide capture probe, or the like). In some aspects, the biochemical assay reagent is a dried reagent (e.g., to facilitate long-term storage). In some aspects, the biochemical assay reagent is in solution (e.g., dissolved in an aqueous buffer or an organic solvent).

In some aspects, one or more of the different pluralities of wells include one or more reagents for a cell-based assay. In some aspects, the cell-based assay includes binding of a binding reagent (e.g., a fluorescence-labeled antibody) to a cell-surface marker (e.g., CD20, CD45, or the like). In some aspects, reagents for a cell-based assay include a labeled cell-specific binding reagent (e.g., a fluorescence-labeled anti-CD20 antibody) or a bead coated with a cell-specific binding reagent (e.g., an antibody directed to a cell-surface marker, e.g., anti-CD20 antibody). In some aspects, reagents for a cell-based assay include a cell (e.g., mammalian, bacterial, yeast cell, or the like). In some aspects, the cell is an adherent cell (e.g., a solid tumor-derived cell). In some aspects, the cell is a suspension cell (e.g., red blood cell (RBC), white blood cell (WBC), circulating tumor cell (CTC), or the like). In some aspects, the cell is a mammalian cell (e.g., a human, primate, hamster, mouse, rat and the like). In some aspects, the cell is a yeast cell. In some aspects, the cell is a bacterial cell (e.g., gram-positive or negative). In some aspects, the cell is a recombinant cell. In some aspects, the cell-based assay is a reporter gene-assay. In some aspects, the reporter-gene is luciferase. In some aspects, the cell-based assay is a cell-enumeration assay. In some aspects, the cell-based assay reagent is a dried reagent (e.g., to facilitate long-term storage). In some aspects, the cell-based assay reagent is in solution (e.g., dissolved in an aqueous buffer, organic solvent or a tissue culture medium).

In some aspects, one or more of the different pluralities of wells include one or more reagents for a homogeneous assay. In some aspects, the homogeneous assay is a biochemical assay. In some aspects, the homogeneous assays is a cell-based assay using suspension cells.

In some aspects, one or more of the different pluralities of wells include one or more reagents for a heterogeneous assay. In some aspects, the reagents for a heterogeneous assay include a bead or a well surface with an immobilized analyte-specific binding reagent (e.g., a covalently bound or physically adsorbed antibody, biotin, or other binding reagent) or a soluble analyte specific binding reagent (e.g., a fluorescence-labeled or enzyme-conjugated antibody, biotin, or other binding reagent).

In some aspects, a first plurality of wells include one or more reagents for a cell-based fluorescence assay (e.g., WBC enumeration). In some aspects a first plurality of wells include one or more reagents for a cell-based fluorescence assay and a different second plurality of wells include one or more reagents for a fluorescence based biochemical assay (e.g., for blood glucose). In some aspects, the fluorescence based biochemical assay is a homogeneous assay (e.g., for blood glucose). In some aspects, the fluorescence based biochemical assay is a heterogeneous assay (e.g., for insulin, a cytokine, or the like). In some aspects a first plurality of wells include one or more reagents for a cell-based fluorescence assay, a different second plurality of wells include one or more reagents for a fluorescence based biochemical assay and a different third plurality of wells include one or more reagents for an absorbance based biochemical assay. In some aspects, one or more reagents are dried reagents.

In some aspects, a first plurality of wells include one or more reagents for an absorbance based cellular assay (e.g., RBC enumeration). In some aspects a first plurality of wells include one or more reagents for an absorbance based cellular assay (e.g., RBC enumeration) and a different second plurality of wells include one or more reagents for a fluorescence based biochemical assay (e.g., for blood glucose). In some aspects, the fluorescence based biochemical assay is a homogeneous assay (e.g., for blood glucose). In some aspects, the fluorescence based biochemical assay is a heterogeneous assay (e.g., for insulin, a cytokine, or the like). In some aspects a first plurality of wells include one or more reagents for an absorbance based cellular assay, a different second plurality of wells include one or more reagents for a heterogeneous fluorescence based biochemical assay and a different third plurality of wells include one or more reagents for a homogeneous fluorescence based biochemical assay. In some aspects, one or more reagents are dried reagents.

In some aspects, a first plurality of wells include one or more reagents for an absorbance based biochemical assay. In some aspects a first plurality of wells include one or more reagents for an absorbance based biochemical assay and a different second plurality of wells include one or more reagents for a fluorescence based biochemical assay. In some aspects, the fluorescence based biochemical assay is a homogeneous assay. In some aspects, the fluorescence based biochemical assay is a heterogeneous assay. In some aspects a first plurality of wells include one or more reagents for an absorbance based biochemical assay, a different second plurality of wells include one or more reagents for a heterogeneous fluorescence based biochemical assay and a different third plurality of wells include one or more reagents for a homogeneous fluorescence based biochemical assay. In some aspects, one or more reagents are dried reagents.

In some aspects, a first plurality of wells include one or more reagents for a fluorescence based biochemical assay. In some aspects a first plurality of wells include one or more reagents for a fluorescence based biochemical assay and a different second plurality of wells include one or more reagents for an absorbance based biochemical assay. In some aspects, the absorbance based biochemical assay is a homogeneous assay. In some aspects, the absorbance based biochemical assay is a heterogeneous assay. In some aspects a first plurality of wells include one or more reagents for a fluorescence based biochemical assay, a different second plurality of wells include one or more reagents for a heterogeneous absorbance based biochemical assay and a different third plurality of wells include one or more reagents for a homogeneous absorbance based biochemical assay. In some aspects, one or more reagents are dried reagents.

Figure 12:
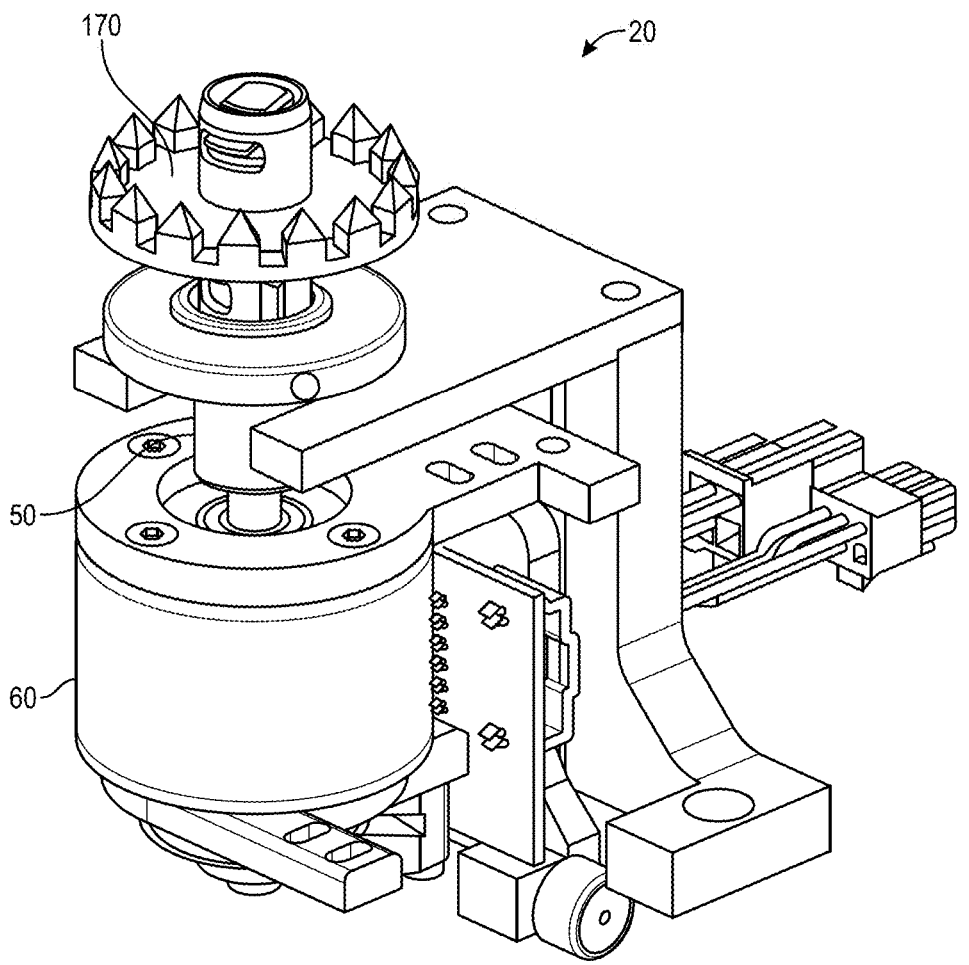
FIG. 12 shows a rotation assembly in one aspect of the present invention.
Figure 13:
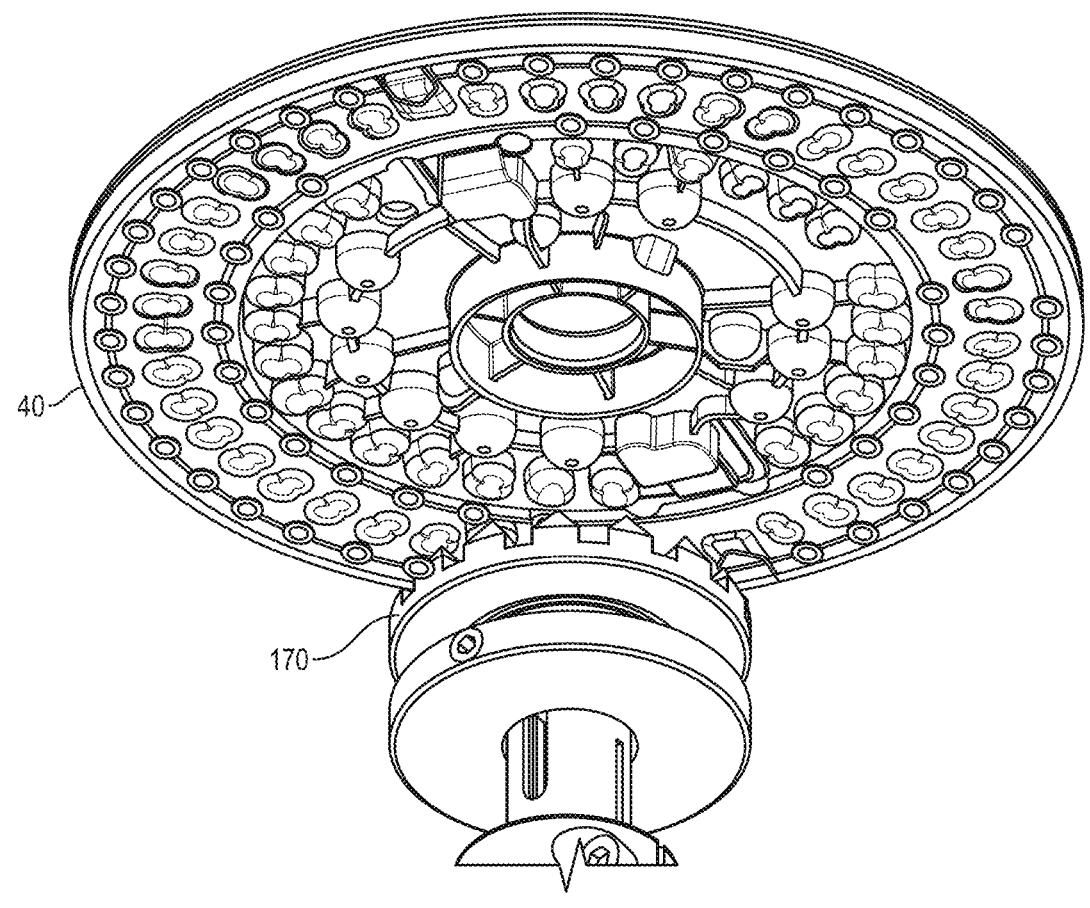
FIG. 13 shows an engagement platform for supporting a planar substrate in one aspect of the invention.

It is envisioned that the planar substrate 40 is secured to the rotation assembly 20 in a number of various ways. In certain aspects, the planar substrate 40 is secured to an engagement platform of the rotation assembly which is disposed on the drive shaft of the rotational motor. FIG. 12 shows a rotation assembly 20 having a rotational motor 60, drive shaft 50 and engagement platform 170 for supporting and securing the planar substrate 40 during operation of the sample analyzer. The planar substrate 40 is placed onto the engagement platform 170 as shown in FIG. 13 such that grooves on the bottom surface of the planar substrate 40 engage recesses on the engagement platform 170.

Figure 14:
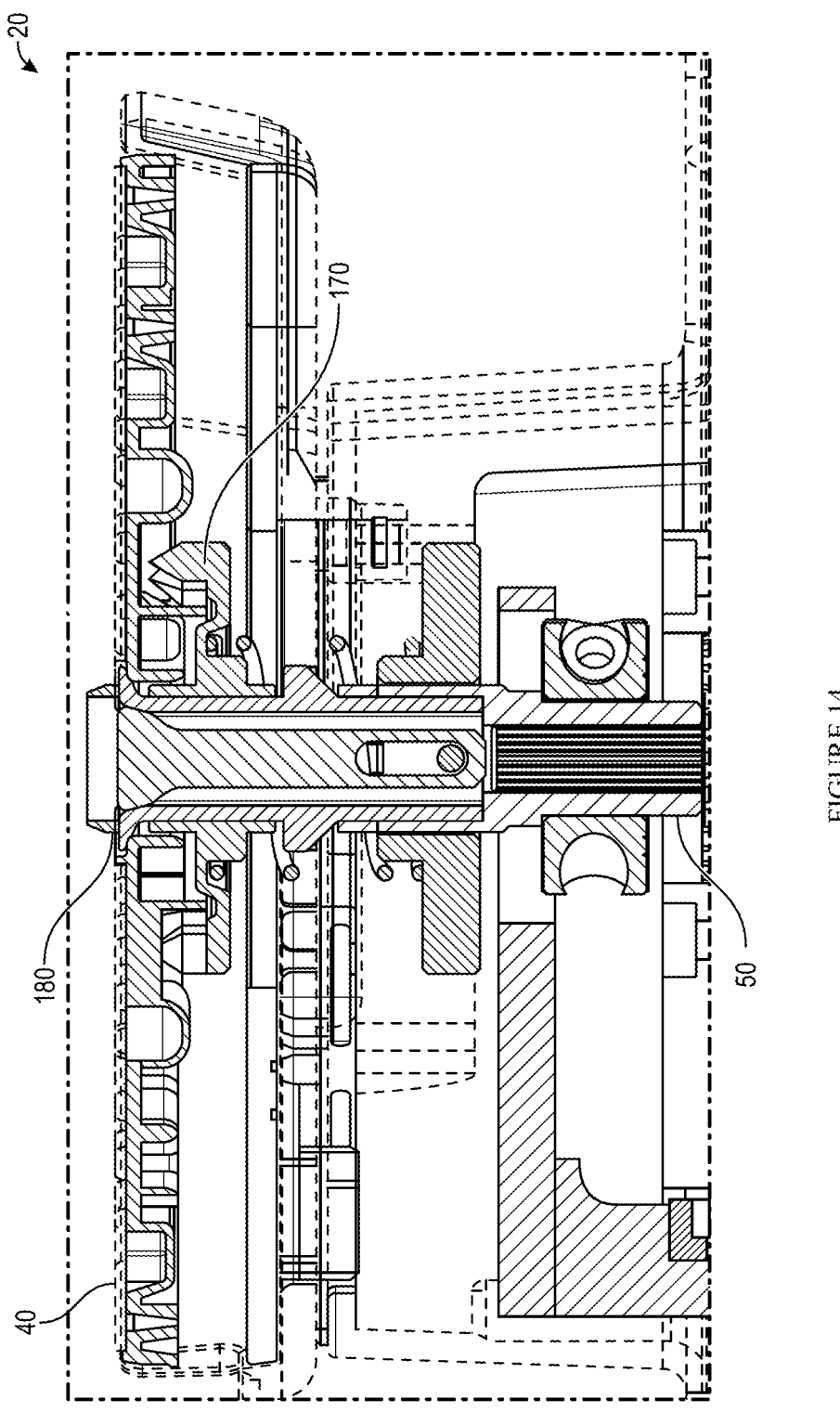
FIG. 14 shows a rotation assembly having a planar substrate clamped onto an engagement platform in one aspect of the present invention.

In one aspect, a clamping mechanism 180 may be used to secure the planar substrate to the engagement platform 170 as shown in FIG. 14. For example, the end portion of the drive shaft 50 may include a clamping mechanism 170 configured to traverse a through hole in the center of the planar substrate and secure the planar substrate 40 to the engagement platform by sandwiching the planar substrate 40 between the clamp mechanism 180 and the engagement platform 170 as shown in FIG. 14.

Once a planar substrate is secured to the rotation assembly, the planar substrate is rotated and the sample wells are analyzed via the optical assembly and the processor.

As such, in another embodiment, the disclosure provides a method of analyzing a sample using the automated sample analyzer of the disclosure. The method includes: a) coupling a substrate to the rotation assembly, the substrate having a well disposed within a perimeter of the substrate, wherein the well includes a reaction mixture having a sample and reagent; b) rotating the substrate within a plane of rotation; c) determining optimal focus and moving the rotation assembly to be in an appropriate position such that the reaction mixture is coincident with the focal plane of excitation and simultaneously with the focal plane of the optical assembly; and d) detecting emission light of the reaction mixture via the optical assembly and processor, thereby analyzing the sample.

In yet another embodiment, the disclosure provides a method of analyzing a sample. The method incudes: a) rotating a substrate having a well disposed within a perimeter of the substrate, wherein the substrate is configured to hold a reaction mixture including a sample and reagent; b) illuminating the reaction mixture while the substrate is being rotated using an optical assembly having an illumination source and an illumination detector, wherein the optical assembly is operable to irradiate the reaction mixture with light emitted from the illumination source and detect emission light from the reaction mixture via the illumination detector, and wherein the optical assembly is configured to generate a coincidence of the focal points of the illumination and detection light paths on a plane of rotation of the substrate; c) collecting and processing sequential measurements of detected emission light at dynamic intervals during rotation of the substrate; d) adjusting the position of the substrate upon instructions from a processor by changing a height of the plane of rotation of the substrate relative to the focal point while the position of the focal point remains constant; e) collecting and processing sequential measurements of detected emission light at dynamic intervals during rotation of the substrate; and f) determining the amount of an analyte of the reaction mixture based on the sequential measurements of (c) or (e).

In certain aspects the methods of the present disclosure include mixing a sample with one or more reagents and loading the sample into the sample well. The planar substrate is then rotated and the mixture is illuminated and recorded for analysis.

In certain aspects the methods of the present disclosure include loading a sample into the sample well which includes one or more reagents thereby producing a mixture. The planar substrate is then rotated and the mixture is illuminated and recorded for analysis.

In certain aspects the methods of the present disclosure utilize beads having a fluorescently labeled moiety. In some aspects the method includes mixing a sample and a reagent including beads to produce a mixture and loading the mixture into the sample well. The mixture may be allowed to incubate and then allowed to settle on the bottom of the sample well or otherwise aggregated to a particular region of the well. For bulk scanning there is no settle step required.

The planar substrate is then rotated and the mixture is illuminated and recorded for analysis.

In certain aspects the methods of the present disclosure include preparing fluorescently labeled beads, mixing the beads with a sample and allowing incubation of the beads in the sample. The mixture is then loaded into a sample well of the planar substrate. The beads are then allowed to settle on the bottom of the sample well or otherwise aggregated to a particular region of the well. The planar substrate is then rotated and the mixture is illuminated and recorded for analysis.

In various aspects of the method of the disclosure, the beads may be allowed to settle to the bottom of the sample well. Alternatively, the beads may be aggregated to a particular region of the sample well. Aggregation may be accomplished by centrifugal force produced by rotation of the planar substrate. Aggregation may also be accomplished through surface functionalization of the inner surface of the well such that the beads are aggregated at a particular region of the sample well. Aggregation may also be accomplished by using magnetic beads and applying a magnetic field to aggregate the beads. As such, in certain aspects, the system analyzer of the present disclosure includes a magnetic source configured to interact with a sample.

In various aspects, the methods of the disclosure include rotating the planar substrate and then determining optimal focus and moving the rotation assembly to be in an appropriate position such that the reaction mixture is coincident with the focal plane of excitation and simultaneously with the focal plane of the optical assembly. To accomplish optimal focus, focus scans and focus analysis is performed to determine the location of the bottom of the sample well. Additional scans are then performed to collect data for analysis.

In certain aspects, focus scans are started with the focal point being below the planar substrate. During the scan acquisition the focal height moves up toward and through the bottom surface of a well as it is moved over the objective lens. An image is generated from left to right as the bottom surface moves over the objective lens rotationally at a given radius. Each new scan line from top to bottom shows the same rotational and radial position at a new focal height.

Focus analysis is then performed. This includes fitting data to a distribution (e.g., Gaussian distribution) and then finding peak values for each row and filtering data by standard distribution of peaks. Fit line to remaining data points. This solution was found to produce a repeatable focal plane relative to fluorescence of plastic while being resilient to influence from the sample or other artifacts in the image.

The determined focal plane is the height of the bottom surface of the well. From there an offset is added to get the focal plane of the aggregated beads in the well. This focal plane is determined using focus metrics, then optimized using signal to background measurements.

Data scans are then performed. During the scan acquisition the focal height remains static as the planar substrate is moved over the objective lens. An image is generated from left to right as the planar substrate moves across the objective lens rotationally at a given height. Each new scan line from top to bottom shows the same rotational and focal position at a new radius.

Initially, data was captured by picking a single focal height then moving across the well radially through the scan. The consumable and mount stack-up makes it so that the wells enter the detection region at different heights. The interface of the planar substrate with the drive shaft can introduce a tip and tilt across the entire planar substrate. The manufacture of the planar substrate may also introduce small scale differences from one well to the next. The effect is that the beads in different wells do not all lie within the assembly's depth of field across all wells if a single Z plane is selected. An "Adjusted Z Scan" is performed which moves to a new focal position for each well in a scan.

Before an Adjusted Z Scan can be taken the assembly must perform a focus scan to determine the appropriate focal heights for each sample well to be scanned. The planar substrate is constantly spinning and bringing the next sample well to the detection region. After one well leaves the detection region, and before the next well enters the detection region, the focal height will move from the appropriate level for the last well to the next.

In certain aspects, image analysis is then performed. Constructed images of the beads are analyzed to quantify the brightness of the beads. In some aspects, the beads will have very little to undetectable levels of fluorescence so that identifying a bead always means signal from the sample. Even when the background is not zero, a bead-finding algorithm can improve the sensitivity of a measurement by reducing the effect of background fluorescence on signal. The algorithm analyzes the image to find groups of pixels that meet criteria indicating the light reported by the pixels came from the same bead. The criteria can include the shape of the group of pixels (e.g., eccentricity), the size of the group (e.g., number of pixels, diameter of group), and other criteria, with ranges potentially applied to each criterion. The algorithm then reports the number of beads found in the image and parameters that quantify the strength of the signal from the beads, e.g., average signal, signal of specific percentile, histogram of bead intensities, variation of bead intensities, minimum bead intensity, maximum bead intensity, mean bead intensity, median bead intensity. The algorithm also reports statistics on the background, e.g., magnitude of local background, variation of local background, magnitude of global background, variation of global background. From these (and other) derived values, the algorithm can report the signal value for the well.

Motion and Acquisition Parameters: For focus scans it is important to know the relationship of data points in an image to physical motor positions. To do this the motion and data acquisition must have reliable timing. In data scans the radial movement per scan line determines our rotational speed and our sampling rate. These parameters enable image generation with pixels that have equal resolution in both dimensions of the image allowing for data processing techniques that rely on shape.

Aggregation: The purpose of aggregation is to tightly pack the beads in a predictable region. Tightly packing the beads allows for better signal to background by filling the excitation voxel completely with sample, as well as giving us a region easily distinguishable from background that is representative of the bead population.

Real Time Focus Tracking: Using a separate detector and optionally a second light source the focus detector and the bead detector can be offset such that the focus detector could constantly track the position of the bottom of a well and keep beads in focus throughout a scan in real time.

AutoFocus: The focus scan and focus analysis described herein use auto-fluorescence of the planar substrate to locate a sample well in the range of focus travel.

In one aspect, autofocus is performed by laser reflectance to locate the planar substrate using a confocal detector that measures the reflected intensity of the excitation light. This method can include use of an aperture that allows the excitation light to illuminate the entire entrance pupil of the objective lens, which can give tighter tolerances on the determined location of the planar substrate. Optimum focus occurs when the signal is a maximum.

In one aspect, autofocus is performed using a second light source that fills the back aperture which functions along the same lines as the laser reflectance method. The width of this light can be controlled independently of the light from the excitation laser. It uses confocal detection similar to the laser reflection method. Optimum focus occurs when the signal is a maximum.

In one aspect, autofocus is performed using off-axis (e.g., dual or ring beam or similar) displacement to locate the planar substrate using a 1-dimensional or 2-dimensional detector. This method does not need a confocal pinhole, the pixels of the detector act as pinholes. So, it has easier alignment than the confocal methods. Geometrical criteria determine optimum focus (location of images of dual beams, shape of ring beam).

In one aspect, autofocus is performed using bright field imaging using a 2-dimensional detector to locate the beads directly without the need for locating the disc and characterizing the offset between the disc surface and the beads. This method can illuminate the beads from the top or from the bottom (e.g., using a light source similar to the second light source that fills the back aperture method above). This method does not need confocal detection—the pixels of the detector act as pinholes. When illuminated from above, the detector will see the shadow of beads when in focus. When illuminated from below, the detector will see reflected light from the beads.

In still another embodiments, the disclosure provides a method of detecting a disease or disorder in a subject. The method includes: a) obtaining a sample from a subject; b) analyzing the sample using automated sample analyzer and method of the disclosure; and c) detecting a disease or disorder in the subject based on the analysis of (b), thereby detecting a disease or disorder in the subject.

In some aspects, the methods of the present disclosure include collecting a sample from a subject. In some aspects, the sample is collected in a sample container.

In some aspects, the sample container is a sterile container or pod. In some aspects, the sample container is placed onto the detection system by a skilled technician.

In certain aspects, the methods include optionally performing a quality control test on the sample, wherein, if the sample passes the quality control test, the sample is analyzed for analytes interest to the subject, and, if the sample fails the quality control step, the sample is discarded, the analytes of interest are not analyzed, or the results of the analysis of the analytes of interest are not reported to the subject. In some aspects, the quality control test is performed prior to the analysis of analytes of interest to the subject. In some aspects, the quality control analysis is performed parallel to the analysis of analytes of interest to the subject.

In some aspects, the sample is a blood sample. In some aspects, the blood sample is fingerprick blood. In some aspects, the blood sample volume is between about 15 μl and about 150 μl, between about 20 μl and about 125 μl, between about 25 μl and about 100 μl, or between about 50 μl and about 70 μl. In some aspects the blood sample volume is about 10 μl, about 15 μl, about 20 μl, about 25 μl, about 30 μl, about 35 μl, about 40 μl, about 45 μl about 50 μl, about 55 μl, about 60 μl, about 65 μl, about 70 μl, about 75 μl, about 80 μl, about μl, 90 μl, about 95 μl, about 95 μl, or about 100 μl. In some aspects, the blood sample volume is between about 50 μl and about 100 μl. In some aspects, the blood sample volume is about 55 μl. Devices and methods for collecting fingerprick blood are known in the art. Exemplary devices useful for collecting fingerprick blood can include, e.g., devices by Seventh Sense Biosystems (e.g., using TAP Touch-Activated Phlebotomy™ or HemoLink™ technology). In some aspects, fingerprick blood collected from a subject includes less than 20%, less than 15%, less than 10%, less than 5%, less than 3%, less than 2%, or less than 1% interstitial fluid. In some aspects, fingerprick blood collected from the subject includes at least 80%, at least 85%, at least 90%, at least 95%, at least 97%, at least 98%, or at least 99% venous blood. In some aspects, interstitial fluid is not detectable in fingerprick blood collected from the subject.

In some aspects, the blood sample is obtained by venipuncture (e.g., using a needle). In some aspects, the blood sample is collected by a phlebotomist. In some aspects the blood sample is collected with an evacuated tube or a vacuum tube (e.g., Vacutainer® by Becton Dickinson & Co, Vacuette® by Greiner Bio-One GmbH). In some aspects, the blood sample is between about 1 ml and about 50 ml, between about 5 ml and about 30 ml and between about 10 ml and about 20 ml. In some aspects, the blood sample is about 15 ml. In some aspects, the blood sample is an aliquot from a larger sample, e.g., an aliquot between about 1 μl and about 250 μl, between about 5 μl and about 200 between about 10 μl and about 175 μl, between about 15 μl and about 150 μl, between about 20 μl and about 125 μl between about 25 μl and about 100 μl, or between about 50 μl and about 70 μl. In some aspects, the aliquot is between about 1 μl and about 10 μl. In some aspects, the aliquot is between about 50 picoliter (50 pl) and about 100 nanoliter (100 nl).

In some aspects, the methods further include centrifuging the sample.

In some aspects the methods further include diluting the sample. In some aspects, the sample is diluted in a multiwell plate provided herein. In some aspects, the sample is diluted and transferred to a sample well of a planar substrate provided herein. In some aspects, diluting the sample includes preparing a serial dilution of the sample. In some aspects, sample dilutions are prepared, e.g., using a piezoelectric or an acoustic liquid handling device (e.g., Labcyte Echo®).

In some aspects, diluting the sample includes preparing a serial dilution of the sample. In some aspects, the serial dilution includes a serial 2-fold, 3-fold, 5-fold or 10-fold dilution, such as serial 2-point, 3-point, 4-point, 5-point, 6-point, 7-point, 8-point, 9-point, 10-point, 11-point or 12-point dilution. In some aspects, the sample is not diluted serially, e.g., a sample dilution series can include a 1:3, 1:5, 1:10, 1:100, and a 1:500 dilution of sample. In some aspects, the dilution factors or numbers of dilutions in a dilution series are dependent on which two or more analytes of interest to the subject are selected.

In some aspects, the methods provided herein include a seamless integration of sample collection from the patient (e.g., fingerprick) to sample preparation (e.g., centrifugation, bulk sample dilution, dispensing of sample into multiwell plate), sample testing (e.g., start of biochemical or cell-based assays in multiwell plate) and the reporting of test results to the subject. In some aspects, sample preparation begins within 60 min, within 45 min, within 30 min, within 20 min, within 15 min, within 10 min, within 5 min, within 3 min, or within 1 min following sample collection. In some aspects, sample testing in a multiwell plate (e.g., a traditional plate or a multiwell plate provided herein) begins within 60 min, within 45 min, within 30 min, within 20 min, within 15 min, within 10 min, within 5 min, within 3 min, or within 1 min following sample collection. In some aspects, sample testing begins within 60 min, within 45 min, within 30 min, within 20 min, within 15 min, within 10 min, or within 5 min following sample collection. In some aspects, sample testing is completed within 12 hrs, within 10 hrs, within 8 hrs, within 6 hrs, within 4 hrs, within 3 hrs, within 2 hrs, within 90 min, within 60 minutes, within 45 min, within 30 min, or within 20 min following sample collection. In some aspects, test results are communicated to the customer (e.g., by email) or accessible in a database within 12 hrs, within 10 hrs, within 8 hrs, within 6 hrs, within 4 hrs, within 3 hrs, within 2 hrs, within 90 min, within 60 minutes, within 45 min, within 30 min, or within 20 min from sample collection.

In some aspects, the sample is a biological sample obtained from a subject. In some aspects, the biological sample is a liquid sample. In some aspects, the liquid sample is a blood sample (e.g., whole blood, plasma, or serum), a urine sample, or any other body fluid (e.g., amniotic fluid, bile, breast milk, cerebrospinal fluid, gastric acid, lymph, mucus (e.g., nasal drainage or phlegm), pericardial fluid, peritoneal fluid, pleural fluid, pus, rheum, saliva, semen, sputum, synovial fluid, sweat, tears, vaginal secretion, vomit, and the like).

The sample can be obtained non-invasively or invasively. Invasive sample collection can include, e.g., sample collection using an intravenous or hypodermic needle. In some aspects, the sample can be obtained by fingerprick using a fingerprick device. Fingerprick devices that can be used in the methods provided herein include, without limitation, a TAP Touch Activated Phlebotomy™ device by Seventh Sense Biosystems or a HemoLink™ device by Tasso, Inc.

In some aspects, the subject is a human patient having a disease, disorder, or other condition (e.g., a metabolic disease, a genetic disorder, an inflammatory disease, an autoimmune disease, a neurodegenerative disorder, a psychiatric disorder and the like).

In some aspects, the sample is a human blood sample. In some aspects, the human blood sample is obtained using a fingerprick device.

Analytes, or clinical parameters, that can be analyzed using the sample analyzer or methods described herein can include analytes or clinical parameters related to a subject's disease condition, a subject's general health status, wellness or life-style, a subject's genotype, or combinations thereof.

The analytes described herein can include any molecular or cellular component of a biological sample. In some aspects, analytes include a protein (e.g., PSA), a nucleotide (e.g., an mRNA expression level or DNA sequence), a sugar (e.g., glucose, or a posttranslational protein modification), a lipid (e.g., triglycerides) or lipid particle (e.g., LDL, HDL, VLDL, and the like), a metabolite (e.g., lactate, pyruvate), a metal ion or mineral (e.g., Na+, Fe2+), a vitamin (e.g., ascorbic acid), a cell (e.g., white blood cell, platelet, virus, pathogen cell, such as a bacterium or a eukaryotic pathogen), or combinations thereof. Analytes can be analyzed qualitatively (e.g., presence or absence) or quantitatively (e.g., analyte concentration or number of analytes per volume). Analyte concentrations can be expressed in absolute terms (e.g., analyte concentration in a sample) or relatively (e.g., percent of a population).

In some aspects, a subject's disease condition can include, e.g., without limitation, a metabolic disorder (e.g. diabetes, obesity, metabolic syndrome, and the like), a liver disease (e.g., cirrhosis), a kidney disease (e.g., acute or chronic kidney disease, kidney cancer), a pancreas disease (e.g., acute pancreatitis, chronic pancreatitis, hereditary pancreatitis, pancreas cancer), an inflammatory disorder (e.g., rheumatoid arthritis, inflammatory bowel disease), a cardiovascular disorder (e.g., angina, myocardial infarction, stroke, atherosclerosis), an immune or autoimmune disorder (e.g., lupus erythematosus, celiac disease), a cancer (e.g., multiple myeloma, lymphoma, leukemia, prostate cancer, breast cancer, and the like), an infectious disease (e.g., Lyme Disease, HIV, sexually transmitted diseases (STDs), and the like), an endocrine disorder (e.g., Cushing's Syndrome, Growth Hormone Deficiency), a blood disorder (e.g., anemia, a bleeding disorder, such as hemophilia, or blood cancer), a psychiatric or behavioral disorder or condition (e.g., attention deficit disorder), and others.

In some aspects, analytes or clinical parameters relating to a subject's disease condition can include, e.g., without limitation, adenovirus DNA, alanine aminotransferase (ALT/SGPT), albumin, alkaline phosphatase (ALP), alpha-1-acid glycoprotein, alpha-1-antitrypsin (e.g., total), alpha-fetoprotein (AFP), amphetamines, amylase, red blood cell (RBC) antibody, antinuclear antibodies (ANA), apolipoprotein (e.g., apo A-1, apo B), aspartate aminotransferase (AST/SGOT), B-cell count, beta-2 microglobulin, bilirubin (e.g., direct or total), blood urea nitrogen (BUN), *borrelia* antibody, brain natriuretic peptide (BNP), calcitonin, calcium (e.g., blood, urine), cancer antigens (e.g., CA 125, CA 15-3, CA 27.29, CA 19-9), carbon dioxide, carcinoembryonic antigen (CEA), cardiolipin antibody (ACA, e.g., IgG), complete blood count (CBC), CD4 or CD8 counts (e.g., absolute counts or ratios), *chlamydia* tachomatis, chloride (e.g., blood, urine), cholesterol, cholinesterase, complement component 3 or 4 antigens, cortisol (e.g., total), C-peptide, C-reactive protein (CRP, e.g., CRP—High Sensitivity (hsCRP)), creatine kinase, creatinine (e.g., blood or urine), cyclic citrullinated peptide (CCP) antibody, IgG, cystatin C, cytomegalovirus (CMV) antibody (e.g., IgG or IgM), D-dimer, deamidated gliadin peptide (DGP) antibody (e.g., IgA or IgG), dehydroepiandrosterone sulfate (DHEA-5), deoxypyridinoline crosslinks (DPD) (collagen crosslinks, e.g., urine), double-stranded DNA (dsDNA) antibody (e.g., IgG), *E. coli* Shiga-like toxin, EBV early D Antigen (EA-D), EBV nuclear antibody, EBV viral capsid antigen (VCA), EBV viral capsid antigen (VCA), endomysial antibody (EMA, e.g., IgM or IgG), erythrocyte sedimentation rate, extractable nuclear antigen antibodies (ENA panel) (RNP, Smith, SSA, SSB, SCO-70, JO-1), ferritin, fibrinogen, gastrin, glucose, growth hormone (HGH), *Helicobacter pylori* (*H. pylori*), IgG, hematocrit (HCT), hemoglobin (HGB), hemoglobin A1c (HbA1c), hepatitis A (HAV) antibody (e.g., IgM, total), hepatitis B(HBV) core antibody (e.g., IgM, total), hepatitis B(HBV) surface antibody, hepatitis B(HBV), DNA, hepatitis C(HCV) antibody, hepatitis C(HCV) genotype, hepatitis C(HCV), RNA, HER-2/neu, herpes simplex 1 (HSV1), herpes simplex 2 (HSV2), high-density lipoprotein (HDL), human immunodeficiency virus 1 (HIV-1), HIV-1/HIV-2, homocysteine, immunoglobulins (e.g., IgA, IgG, IgM, IgE, IgG, IgM), IGF-1 (insulin-like growth factor 1), insulin, iron, iron binding capacity (IBC; e.g., total (TIBC)), lactate dehydrogenase, lead, lipase, low-density lipoprotein (LDL), lymphocyte enumeration, magnesium, measles, mumps, and rubella (MMR) immunity, microalbumin (e.g., urine), myoglobin, *Neisseria* gonorrhea (e.g., DNA), natural killer cells (NKC), ova & parasites, parathyroid hormone (PTH), partial thromboplastin time (PTT), phosphorus, inorganic, platelets, potassium (e.g., blood, urine), prealbumin, prostate specific antigen (PSA, e.g., free or total), protein (e.g., total, e.g.; blood or urine), prothrombin pime (PT/INR), red blood cell count (RBC), reticulocyte count (RC), rheumatoid factor (e.g., total), rubella (Measles) antibody (e.g., IgG or IgM), sex hormone-binding globulin (SHBG), sodium (e.g., blood or urine), streptolysin 0 antibody (ASO; e.g., titer), T-cell (e.g., total count), triiodothyronine, thyroglobulin, thyroglobulin antibodies (TAA), thyroid peroxidase (TPO) antibody, thyroid stimulating hormone (TSH), thyroxine binding globulin (TBG), thyroxine (e.g., free T4 or total T4), tissue transglutaminase (tTG) antibody (e.g., IgA or IgG), *toxoplasma* (e.g., IgG or IgM), transferrin, triglycerides, triiodothyronine (e.g., free T3 or total T3), troponin I (tCNI), tuberculosis, uric acid, Varicella-zoster (VZV) antibody, and white blood cell count (WBC).

In some aspects, a subject's general health status, wellness or life-style can include or be affected by, e.g., without limitation, allergies/hypersensitivities, blood pressure, body weight (e.g., body-mass-index), diet (e.g., Western diet, Mediterranean diet, processed foods, home-cooked meals), drinking habits (e.g., frequency, quantity, or type of alcohol consumption), drug use (e.g., prescription drugs, recreational drugs, doping), environmental factors (e.g., pollution, climate), exercise habits (e.g., frequency, intensity, type of exercise), fertility, pregnancy, rest period (e.g., day or night-time, duration, frequency), smoking habits, stress levels (e.g., chronic, acute), vacation schedule, work schedule, and other factors.

In some aspects, analytes or clinical parameters relating to a subject's general health status, wellness or life-style can include, e.g., without limitation, ACTH (corticotropin), alpha-fetoprotein (AFP; e.g., maternal), amphetamine, androstenedione, anti-mullerian hormone (AMH), apolipoprotein (e.g., apo A-1, apo B), barbiturates (e.g., urine), benzodiazepines (e.g., urine), cortisol (e.g., total), cyclosporine A, ecstasy (MDMA), estradiol, estriol (e.g., unconjugated), estrone, ethanol, folate (folic acid), follicle stimulating hormone (FSH), gamma-glutamyltransferase (GGT), glucose, hCG-chorionic gonadotropin (e.g., blood or urine, qualitative or quantitative), insulin, lithium, low-density lipoprotein (LDL), marijuana (THC), methadone (dolophine), methamphetamines, opiates, phencyclidine (PCP), progesterone, prolactin, propoxyphene, testosterone (e.g., free or total), tricyclic antidepressants (e.g., urine), vitamin B-12, vitamin D 25-OH.

In some aspects, a subject's genotype can include genes related to a subject's health or disease conditions (e.g., life expectancy, disease susceptibility), or other physical or mental traits (e.g., energy level, athletic abilities, intelligence). In some aspects, a subject's genotype can include genes related to a subject's ancestry (e.g., family ties, geographic origins).

In some aspects, the analytes, or clinical parameters, that can be analyzed using the sample analyzer or methods described therein can include a biomarker (e.g., biomarker level in a patient) analyzed in connection with a pharmaceutical treatment of a patient, e.g., a small molecule drug or biotherapeutic (e.g., an antibody or other recombinant protein) treatment. In some aspects, the biomarker is analyzed in the course of a clinical trial, e.g., to analyze the efficacy of an clinical drug candidate in a patient, to analyze a patient's compliance with the treatment regimen, or to select a patient who may benefit from the treatment.

In some aspects, analysis includes analysis of red blood cells (RBC; e.g., RBC count), platelets (e.g., platelet count), or white blood cells (WBC; e.g., WBC count). In some aspects, the WBC includes the totality of WBCs in a blood sample (e.g., cluster of differentiation 45 (CD45)-positive cells, e.g., CD45RA-isotype or CD45RO-isotype; e.g., total WBC count). In some aspects, the WBC includes a T-cell (e.g., cluster of differentiation 3 (CD3)-positive cells), a B-cell (e.g., cluster of differentiation 19 (CD19)-positive cells), a natural killer (NK) cell (e.g., CD3-negative and cluster of differentiation 16 (CD16) and cluster of differentiation 56 (CD56)-positive cells), or combinations thereof. In some aspects, the T-cell includes a T-helper cell (e.g., CD4-positive cells) or a cytotoxic T-cell (e.g., CD8-positive cells). In some aspects, T-helper cells or cytotoxic T-cells can be further classified into naive cells (e.g., CD4RA+ or CD8 RA+), or memory cells (e.g., CD4RO+ or CD8RO−). In some aspects, the blood cell panel includes a circulating tumor cell (CTC; e.g., CTC count). In some aspects, the CTC includes a traditional CTC (e.g., CD45-negative, creatine kinase (CK)-positive cell with intact nucleus), a cytokeratin negative (CK) CTC (e.g., CD45-negative cell with cancer cell-like morphology), a small CTC (e.g., a CD45-negative cell with a size and morphology similar to an average WBC), or a CTC cluster (e.g., two or more CTCs bound together, e.g., cluster of traditional, CK-negative or small CTCs). In some aspects, the blood cell panel includes CD45 (e.g., CD45RA or CD45RO, or both), CD3, CD16, CD56, CD4, CD8, CK, cell morphology (e.g., cell size or shape, tumor cell-like or WBC-like phenotype or appearance, intact or apoptotic nucleus, and the like), or combinations thereof.

In some aspects, analysis complete blood cell (CBC) analysis including white blood cell count (WBC), white blood cell differential (DIFF), absolute neutrophil count, % neutrophils (Neu, PMN, polys), absolute lymphocyte count, % lymphocytes (Lymph), absolute monocyte count, % monocytes (Mono), absolute eosinophil count, % eosinophils (EOS), absolute basophil count, % basophils (BASO), red blood count (RBC), red blood cell distribution (RDW), hemoglobin (Hb), hematocrit (Hct), mean corpuscular volume (MCV), mean corpuscular hemoglobin (MCH), mean corpuscular hemoglobin concentration (MCHC), platelet count (PIT), mean platelet volume (MPV), or combinations thereof.

Analytes, or clinical parameters, that can be analyzed using the multiwell plates, systems, or methods described therein can include analytes present at a wide range of different concentrations in a sample (e.g., a blood sample or urine sample). Analytes can include high-abundance analytes, medium-abundance analytes, and low-abundance analytes. In some aspects, high-abundance analytes include analytes present in a sample at concentrations of >100 μM, e.g., >500 μM, >1 mM, >2 mM, >3 mM, >4 mM, >5 mM, >6 mM, >7 mM, >8 mM, >9 mM, >10 mM, >15 mM, >20 mM, >25 mM, >50 mM, >75 mM, >100 mM, >125 mM, >150 mM, or >200 mM. In some aspects, medium abundance analytes include analytes present in a sample at concentrations between 100 nM and 100 μM (e.g., between 100 nM and 1 μM, between 1 μM and 10 μM, or between 10 μM and 100 μM). In some aspects, low abundance analytes include analytes present in a sample at concentrations of <100 nM, such as <10 nM, <1 nM, <100 pM, <10 pM, or <1 pM.

In some aspects, the sample analyzer further includes a sample dilution station. In some aspects, the sample dilution station includes a liquid handling device capable of preparing a dilution or dilution series of a small sample volume (e.g., 1-200 μl of a human blood sample). In some aspects, the sample dilution station is includes a sample dilution plate (e.g., a disposable traditional multiwell) and a multiwell plate provided herein. In some aspects, the sample dilution station includes a liquid handling device capable of transferring an aliquot of a sample or of a sample dilution from the sample dilution plate to a multiwell plate provided herein. In some aspects, the liquid handling device is capable of preparing a sample dilution series directly in the multiwell plate provided herein.

In some aspects, the sample analyzer includes an operator interface having a data entry device, a display, and, optionally, a barcode reader.

In some aspects, the processor controls operation of the sample dilution station.

In some aspects, the sample analyzer includes an operator interface (e.g., for a skilled technician), having a data entry device (e.g., keyboard, touchscreen, a voice recognition device), a display (e.g., computer screen), and, optionally, a barcode reader.

Although the invention has been described with reference to the above examples, it will be understood that modifications and variations are encompassed within the spirit and scope of the invention. Accordingly, the invention is limited only by the following claims.

What is claimed is:

1. An automated sample analyzer comprising:
a) a rotation assembly operable to start and stop continuous rotation of a substrate, the substrate having a well disposed within a perimeter of the substrate, wherein the well is configured to hold a reaction mixture including a sample and reagent wherein the reaction mixture comprises a fluorescently labeled moiety, wherein the fluorescently labeled moiety comprises a bead and wherein the bead is magnetic;
b) an optical assembly having an illumination source and an illumination detector, wherein the optical assembly is operable to irradiate the reaction mixture with light emitted from the illumination source and detect emission light from the reaction mixture via the illumination detector, and
wherein the optical assembly is configured to generate a coincidence focal point comprising an illumination light path focal point and a detection light path focal point on a plane of rotation of the substrate; and
c) a processor operable to control movement of the rotation assembly, wherein the processor includes functionality to cause the rotation assembly to continually rotate the substrate and adjust a height of the plane of rotation of the substrate relative to the coincidence focal point.

2. The automated sample analyzer of claim 1, wherein the substrate is a disc and the well is disposed within a circumference of the disc.

3. The automated sample analyzer of claim 1, wherein the plane of rotation is perpendicular to an optical axis of light emitted from the illumination source.

4. The automated sample analyzer of claim 1, wherein the height of the plane of rotation is adjusted based on detected emission light.

5. The automated sample analyzer of claim 1, wherein the processor includes functionality to determine when the coincident focal point coincides with a bottom of the well.

6. The automated sample analyzer of claim 1, wherein the processor includes functionality to determine when the coincident focal point coincides with a location within the well.

7. The automated sample analyzer of claim 1, wherein the processor includes functionality to cause the rotation assembly to move the substrate a distance in a direction parallel to the plane of rotation or tilt the substrate to alter the plane of rotation.

8. The automated sample analyzer of claim 1, further comprising one or more imaging devices.

9. The automated sample analyzer of claim 8, wherein the one or more imaging devices is operably coupled to the processor and/or the optical assembly.

10. The automated sample analyzer of claim 1, wherein the processor includes functionality to quantitate an amount of an analyte within the reaction mixture based on the amount of detected emission light.

11. The automated sample analyzer of claim 1, wherein the optical assembly is configured such that an optical axis of the light emitted from the illumination source is substantially parallel to an optical axis of light detected by the illumination detector.

12. The automated sample analyzer of claim 1, wherein the processor includes functionality to continually collect and process sequential measurements of detected emission light at dynamic intervals during rotation of the substrate.

13. The automated sample analyzer of claim 12, wherein the processor includes functionality to correlate sequential measurements of detected emission light with the well.

14. The automated sample analyzer of claim 1, wherein the substrate has a plurality of wells, each containing a reaction mixture.

15. The automated sample analyzer of claim 14, wherein the processor includes functionality to quantitate an amount of an analyte within each reaction mixture based on detected emission light of each reaction mixture.

16. An automated sample analyzer comprising:
a) a rotation assembly operable to start and stop continuous rotation of a substrate, the substrate having a well disposed within a perimeter of the substrate, wherein the well is configured to hold a reaction mixture including a sample and reagent further comprising a magnetic source configured to interact with the reaction mixture;
b) an optical assembly having an illumination source and an illumination detector, wherein the optical assembly is operable to irradiate the reaction mixture with light emitted from the illumination source and detect emission light from the reaction mixture via the illumination detector, and
wherein the optical assembly is configured to generate a common illumination light path focal point and detection light path focal point on a plane of rotation of the substrate; and
c) a processor operable to control movement of the rotation assembly, wherein the processor includes functionality to cause the rotation assembly to continually rotate the substrate and adjust a height of the plane of rotation of the substrate relative to the common focal points.

17. An automated sample analyzer comprising:
a) a rotation assembly operable to start and stop continuous rotation of a substrate, the substrate having a well disposed within a perimeter of the substrate, wherein the well is configured to hold a reaction mixture including a sample and reagent;
b) an optical assembly having an illumination source and an illumination detector, wherein the optical assembly is operable to irradiate the reaction mixture with light emitted from the illumination source and detect emission light from the reaction mixture via the illumination detector, wherein the illumination source light path includes an objective lens, wherein the optical assembly is configured such that a back aperture of the lens is under filled and wherein the optical assembly is configured to generate a common illumination light path focal point and detection light path focal point on a plane of rotation of the substrate; and c) a processor operable to control movement of the rotation assembly, wherein the processor includes functionality to cause the rotation assembly to continually rotate the substrate and adjust a height of the plane of rotation of the substrate relative to the common focal point.

\* \* \* \* \*